(12) United States Patent
Iwakawa et al.

(10) Patent No.: US 8,218,515 B2
(45) Date of Patent: Jul. 10, 2012

(54) COMMUNICATION CONTROL APPARATUS AND COMMUNICATION CONTROL PROGRAM

(75) Inventors: Akinori Iwakawa, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 12/555,424

(22) Filed: Sep. 8, 2009

(65) Prior Publication Data

US 2009/0323661 A1 Dec. 31, 2009

Related U.S. Application Data

(63) Continuation of application No. PCT/JP2007/055718, filed on Mar. 20, 2007.

(51) Int. Cl.
*H04W 8/00* (2009.01)
(52) U.S. Cl. ........................................ 370/338
(58) Field of Classification Search .............. 370/310, 370/328, 338, 351, 352, 353; 709/204
See application file for complete search history.

(56) References Cited

U.S. PATENT DOCUMENTS

| | | | | |
|---|---|---|---|---|
| 4,547,880 A * | 10/1985 | De Vita et al. | ............. | 370/362 |
| 5,557,660 A * | 9/1996 | Crevits et al. | ............. | 379/215.01 |
| 5,887,136 A * | 3/1999 | Yasuda et al. | ................ | 709/204 |
| 7,006,121 B2 * | 2/2006 | Okajima et al. | ............. | 348/14.01 |
| 7,818,784 B2 * | 10/2010 | Kunito et al. | ....................... | 726/2 |
| 2004/0083282 A1 | 4/2004 | Shiga et al. | | |
| 2005/0147118 A1 | 7/2005 | Jonsson | | |
| 2006/0067310 A1 * | 3/2006 | Murai | ........................... | 370/353 |
| 2006/0195593 A1 | 8/2006 | Shiraki et al. | | |
| 2006/0230448 A1 | 10/2006 | Iwakawa et al. | | |
| 2006/0251060 A1 | 11/2006 | Iwakawa et al. | | |
| 2010/0157882 A1 * | 6/2010 | Moriwaki et al. | ............. | 370/328 |

FOREIGN PATENT DOCUMENTS

| | | |
|---|---|---|
| JP | A 2004-153352 | 5/2004 |
| JP | A 2005-130287 | 5/2005 |
| JP | A 2005-518719 | 6/2005 |
| JP | A 2006-238364 | 9/2006 |
| JP | A 2006-268729 | 10/2006 |
| JP | A 2006-270837 | 10/2006 |

* cited by examiner

*Primary Examiner* — Chi Pham
*Assistant Examiner* — Robert Lopata
(74) *Attorney, Agent, or Firm* — Greer, Burns & Crain, Ltd.

(57) ABSTRACT

A communication control apparatus comprises a terminal control part that generates available-terminal information representing a communication terminal belonging to a group of available-terminals and also generates call-status information representing one of the communication terminals having calls and also representing the media of the communication terminals; a terminal/media selecting part that, upon detection of an event occurrence, if the call-status information matches terminal/media information of a terminal/media information storing part and further if changed-terminal/media information of the terminal/media information storing part is included in the available-terminal information, then determines the communication terminal represented by the changed-terminal/media information as a communication terminal to be incorporated into the calls of the media of the communication terminals; and a session control part that establishes a call of the medium of the determined communication terminal between the determined communication terminal and a communication terminal of another user.

7 Claims, 19 Drawing Sheets

| IDa | IDb | IDc |
|---|---|---|

FIG. 3

| IDa | Ms |
|---|---|

FIG. 4

|  | Terminal/<br>media information | | Priority | Changed-terminal/<br>media information | |
|---|---|---|---|---|---|
|  | Audio (Ms) | Video (Mv) |  | Audio (Ms) | Video (Mv) |
| R1 | IDa | — | 5 | IDb | IDc |
| R2 | IDa | — | 4 | IDa | IDc |
| R3 | IDd | — | 3 | IDd | IDb |
| R4 | IDb | IDb | 4 | IDa | IDc |

| IDb | Ms | IDc | Mv |
|---|---|---|---|

FIG. 6

| Originator telephone number (090-1111-2222) | Receiver telephone number (090-1234-5678) | Call-start time (08:45:12) | Call duration (5:00) |

FIG. 11

| Terminal/media information | | Call-relevant information | | | | | Changed-terminal /media information | |
|---|---|---|---|---|---|---|---|---|
| Audio (Ms) | Video (Md) | Originator telephone number | Receiver telephone number | Call-start time | Call duration | Priority | Audio (Ms) | Video (Md) |
| IDa | — | — | 090-1234-5678 | — | 5:00 | 5 | IDb | IDc |
| IDa | — | — | 090-1234-5555 | — | 3:00 | 4 | IDa | IDc |
| IDd | — | 090-8965-4321 | — | — | — | 3 | IDd | IDb |
| IDb | IDb | — | — | 12:45:00 | 1:30 | 4 | IDa | IDc |

| B1 | IDa | IDc | IDd |
|---|---|---|---|

| B2 | IDb | IDe |
|---|---|---|

F I G. 15

| | Terminal/media information | | Priority | Changed-terminal/media information | |
|---|---|---|---|---|---|
| | Audio (Ms) | Video (Mv) | | Audio (Ms) | Video (Mv) |
| R1 | IDa | — | 5 | IDd | IDc |
| R2 | IDa | — | 4 | IDb | IDc |
| R3 | IDa | — | 3 | IDa | IDc |
| R4 | IDd | — | 3 | IDd | IDb |
| R5 | IDb | IDb | 4 | IDa | IDc |

| | Terminal/media information | | Priority | Changed-terminal/media information | | |
|---|---|---|---|---|---|---|
| | Audio (Ms) | Video (Mv) | | Audio (Ms) | Video (Mv) | Data (Md) |
| R1 | IDa | — | 5 | IDa | IDb | IDe |
| R2 | IDa | — | 4 | IDa | IDc | IDc |

| | IDa | IDb | IDc | IDd | IDe |
|---|---|---|---|---|---|
| Audio (Ms) | 10 | 3 | 10 | — | — |
| Video (Mv) | 0 | 3 | 5 | — | — |
| Data (Md) | 0 | 3 | 3 | — | — |

| Terminal/media information | | Priority | Changed-terminal/media information | | |
|---|---|---|---|---|---|
| Audio (Ms) | Video (Mv) | | Audio (Ms) | Video (Mv) | Data (Md) |
| R1  IDa | — | 5 | IDa | IDb | IDe |
| R2  IDa | — | 4 | IDa | IDb | — |
| R3  IDa | — | 3 | IDa | — | — |
| R4  IDa | — | 2 | IDa | IDc | IDc |

FIG. 23

COMMUNICATION CONTROL APPARATUS AND COMMUNICATION CONTROL PROGRAM

CROSS-REFERENCE TO RELATED APPLICATION

This application is a continuation of international application Ser. No. PCT/JP2007/055718, filed Mar. 20, 2007 which designates the United States, incorporated herein by reference, the entire contents of which are incorporated herein by reference.

FIELD

The present invention relates to a ubiquitous computing that provides a computer environment using various instruments at hand instead of user-specified instruments. In particular, the present invention relates to a communication control apparatus for achieving a ubiquitous communication system in which a communication terminal can be determined flexibly and a communication control program.

BACKGROUND

Recently with the widespread of IP telephones using wireless LAN, a softphone by personal computers and the like, users become enable to use more variety of instruments. Accordingly studies have been conducted on so-called ubiquitous computing, in which a computer environment utilized by an individual user and various services given thereby for example, sending and receiving e-mails, reserving and purchasing tickets of various types, are provided by instruments at hand instead of user-specific instruments.

Studies on a ubiquitous communication system also have been conducted. The system applies this ubiquitous computing concept to a communication terminal and combining a plurality of communication terminals such as a mobile telephone, a videophone, a personal computer, a fax machine or the like. Further, in an example of proposed ubiquitous communication systems (see for example Japanese Laid-open Patent Publication No. 2006-270837 and Japanese Laid-open Patent Publication No. 2006-238364), a TV or video camera is used as a transmitter-receiver of video, and a mobile telephone is used as a transmitter-receiver of audio so as to provide functions of a videophone.

In such a ubiquitous communication system, for example, in a case where there are a plurality of communication terminals that can correspond to identical media (video, audio, data and the like) among communication terminals available for a user, a priority that has been set for every communication terminal is referred to so that a communication terminal having the highest priority is determined as the communication terminal to be incorporated into a call.

However, since the priority is set for every communication terminal in the above-mentioned conventional ubiquitous communication system, it is impossible to determine a communication terminal in accordance with a call status of a medium of the communication terminal.

For example, it is assumed that one fixed telephone and two PCs (personal computers) exist. Among these two PCs, one is indicated as PC-1, and the other is indicated as PC-2. In such a case, in determining a communication terminal that can handle a video, it is impossible to select PC-1 when the fixed telephone has an audio call, and to determine PC-2 when the mobile telephone has an audio call. Namely in the above-mentioned conventional ubiquitous communication system, for example when the priority of PC-2 is set higher than that of PC-1, the PC-2 with the higher priority is determined uniformly as the communication terminal that can handle video, even if the fixed telephone has an audio call or even if the mobile telephone has an audio call.

SUMMARY

According to an aspect of the invention a communication control apparatus according to the present invention is characterized in that it manages an available-terminal group including a plurality of communication terminals available for a user among a plurality of communication terminals, and that controls a call between a communication terminal belonging to the available-terminal group and a communication terminal of another user, thereby functioning as a single and virtual terminal that integrates the available-terminal group with respect to the communication terminal of the other user, the communication control apparatus including:

a terminal control part that generates available-terminal information representing a communication terminal belonging to the available-terminal group and call-status information representing a communication terminal having a call among the communication terminals belonging to the available-terminal group and a medium of the communication terminal, a terminal/media information storing part that stores terminal/media information representing a communication terminal and a medium of the communication terminal, and changed-terminal/media information representing a communication terminal to be changed from the communication terminal represented by the terminal/media information and a medium of the communication terminal to be changed, and a terminal/media selecting part that, upon detecting occurrence of an event regarding a communication control sequence or an event regarding terminal environmental change of the communication terminal determines the communication terminal represented by the changed-terminal media information as a communication terminal to be incorporated into a call of the medium of the communication terminal, when the communication terminal represented by the call-status information and the medium of the communication terminal match the communication terminal represented by the terminal/media information and the medium of the communication terminal and further when the communication terminal represented by the changed-terminal/media information is included in the communication terminals represented by the available-terminal information. The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram showing an example of a data structure of available-terminal information generated by a terminal control part in the communication control apparatus.

FIG. 4 is a diagram showing an example of a data structure of call-status information generated by the terminal control part.

FIG. 5 is a diagram showing an example of a data structure of a terminal/media information storing part in the communication control apparatus.

FIG. 6 is a diagram showing an example of a data structure of selection information generated by the terminal/media selecting part in the communication control apparatus.

FIG. 11 is a block diagram showing an example of a data structure of call-status information generated by the terminal control part in the communication control apparatus.

FIG. 12 is a diagram showing an example of a data structure of a terminal/media information storing part in the communication control apparatus.

FIG. 15 is a diagram showing an example of a data structure of an integrated terminal information storing part in the communication control apparatus.

FIG. 18 is a diagram showing an example of a data structure of the terminal/media information storing part changed by a priority-changing part in the communication control apparatus.

FIG. 20 is a diagram showing an example of a data structure of a terminal/media information storing part in the communication control apparatus.

FIG. 21 is a diagram showing an example of a data structure of an individual priority storing part in the communication control apparatus.

FIG. 23 is a diagram showing an example of a data structure of the terminal/media information storing part in a case of storing changed-terminal/media information that defines available residual communication terminals.

DESCRIPTION OF THE INVENTION

Description of Embodiments

Figure 1:
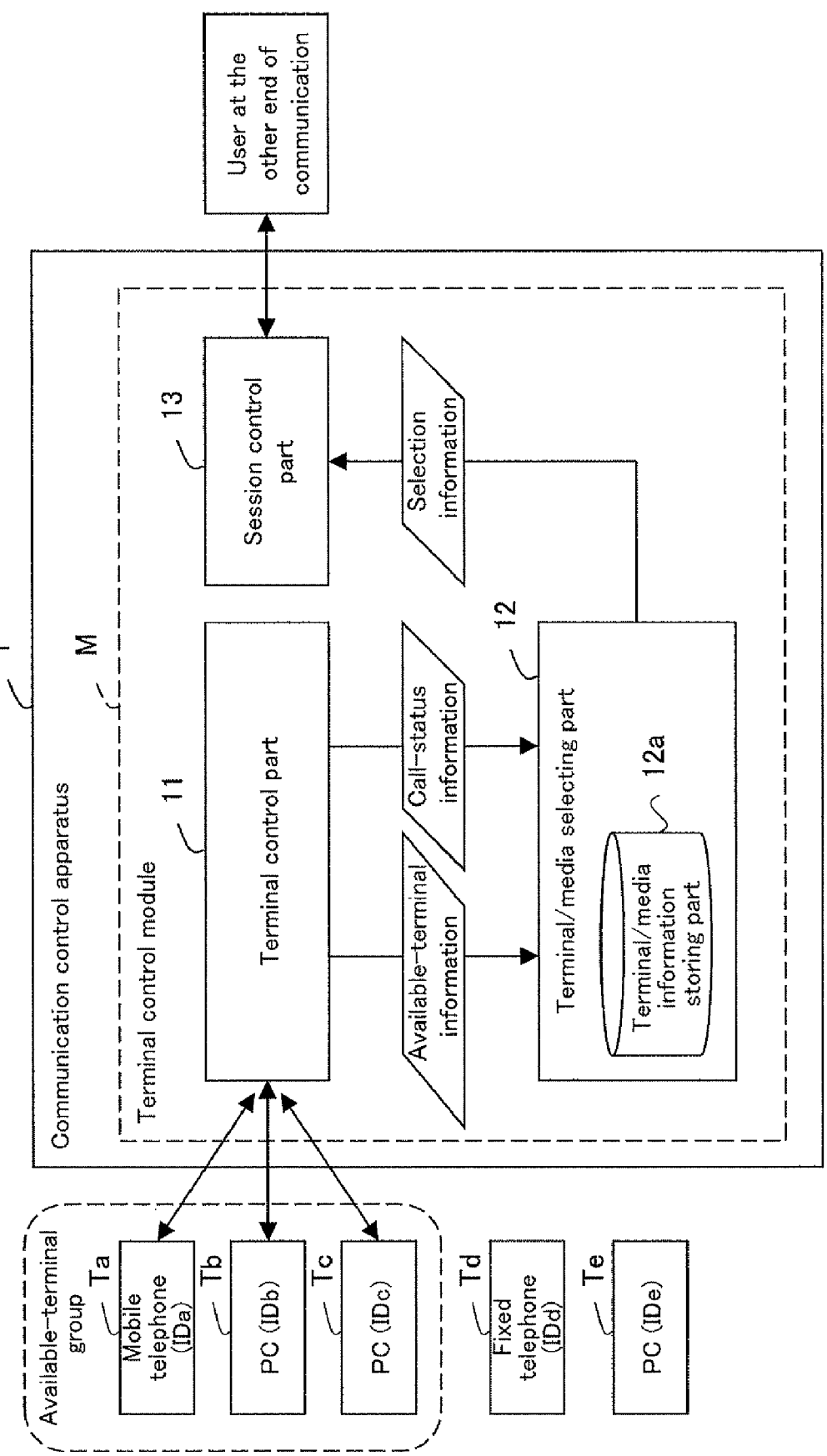
FIG. 1 is a block diagram showing a schematic configuration of a communication control apparatus according to a first embodiment of the present invention.

In the communication control apparatus of an embodiment of the present invention, the terminal control part generates available-terminal information and call-status information. The available-terminal information denotes information representing a communication terminal belonging to an available-terminal group. The call-status information denotes information representing a communication terminal having a call among the communication terminals belonging to the available-terminal group and also a medium of the communication terminal. Upon detecting occurrence of the above-mentioned event, when the communication terminal represented by the call-status information and the medium of the communication terminal match the communication terminal represented by the terminal/media information stored in the terminal media information storing part and also the medium of the communication terminal, and further when the communication terminal represented by the changed-terminal/media information stored in the terminal/media information storing part is included in the communication terminals represented by the available-terminal information, the terminal/media selecting part determines the communication terminal represented by the changed-terminal/media information as a communication terminal to be incorporated into the call of medium of the communication terminal. Thereby it is possible to determine flexibly the communication terminal to be incorporated into a call in accordance with the call status of the medium of the communication terminal.

It is preferable that the communication control apparatus according to the embodiment of the present invention includes further a session control part that establishes the call of the medium of the communication terminal determined by the terminal/media selecting part, between the communication terminal determined by the terminal/media selecting part and the communication terminal of the other user.

According to the above-mentioned configuration, the session control part can establish a call of a medium of a communication terminal determined by the terminal/media selecting part, between the communication terminal determined by the terminal/media selecting part and the communication terminal of the other user.

In the communication control apparatus according to the embodiment of the present invention, it is preferable that the terminal/media information storing part retains a priority in association with the terminal/media information and the changed terminal/media information, and in a case where there are plural pieces of terminal/media information matching the call-status information, the terminal/media selecting part selects terminal/media information having the highest priority among the plural pieces of terminal/media information, and when a communication terminal represented by the changed-terminal/media information associated with the selected terminal/media information is included in the communication terminals represented by the available-terminal information, the terminal/media selecting part determines the communication terminal represented by the changed-terminal/media information as a communication terminal to be incorporated into the call of the medium of the communication terminal.

According to the above-mentioned configuration, in a case where there are plural pieces of terminal/media information matching the call-status information, the terminal/media selecting part selects terminal/media information having the highest priority among the pieces of terminal/media information. Thereby in a case where the communication terminal represented by the changed-terminal/media information associated with the selected terminal/media information is included in the communication terminals represented by the available-terminal information, the terminal/media selecting part can determine the communication terminal represented by the changed-terminal/media information as the communication terminal to be incorporated into the call of the medium of this communication terminal. Thereby for example, by setting the priority higher, it is possible to determine a communication terminal to be preferentially incorporated into a call.

It is preferable that the communication control apparatus according to the embodiment of the present invention includes further:

an accepting part that accepts terminal/media information and changed-terminal/media information corresponding to the terminal/media information; and a priority-changing part that changes priority retained in the terminal/media information storing part so that, in a case where the terminal/media information accepted by the accepting part has been stored in the terminal/media information storing part, the priority of the terminal/media information accepted by the accepting part becomes greater than the priority of terminal/media information that has been stored in the terminal/media information storing part.

According to the above-mentioned configuration, the accepting part accepts the terminal/media information and also the changed-terminal/media information corresponding to the terminal/media information. In a case where the thus accepted terminal/media information has been stored in the terminal/media information storing part, the priority-changing part changes the priority retained by the terminal/media information storing part so that the priority of the accepted terminal/media information becomes higher than that of the terminal/media information that has been stored in the terminal/media information storing part. Thereby the communication terminal represented by the changed-terminal/media information accepted by the accepting part becomes a communication terminal to be incorporated into a call preferentially to the communication terminal represented by the changed-terminal/media information that has been stored in the terminal/media information storing part. For this reason, for example, in accordance with the user's convenience or the status of the communication terminal, it is possible to determine a communication terminal to be incorporated preferentially into the call.

It is preferable that the communication control apparatus according to the embodiment of the present invention includes further an individual priority storing part that retains an individual priority that has been set for a combination of a communication terminal and a medium of the communication terminal, wherein the changed-terminal/media information represents a plurality of communication terminals to be changed from the communication terminals represented by the terminal/media information and media of the plural communication terminals, in a case where not all of the plural communication terminals represented by the changed-terminal/media information are included in the communication terminals represented by the available-terminal information, the terminal/media selecting part extracts the individual priority retained in the individual priority storing part on the basis of the communication terminal included in the communication terminals represented by the available-terminal information and the medium of the communication terminal, among the plural communication terminals represented by the changed-terminal/media information, and calculates a summary priority based on the thus extracted individual priority and when the calculated summary priority is at least equivalent to a threshold value, then the terminal/media selecting part determines the communication terminal included in the communication terminals represented by the available-terminal information among the plurality of communication terminals represented by the changed-terminal/media information, as a communication terminal to be incorporated in the call of the medium of the communication terminal.

According to the above-mentioned configuration, even when not all of the plural communication terminals represented by the changed-terminal/media information are included in the communication terminals represented by the available-terminal information, if the summary priority is at least equivalent to a threshold value, it is possible to determine a communication terminal included in the communication terminals represented by the available-terminal information among a plurality of communication terminals represented by the changed-terminal/media information, as a communication terminal to be incorporated into the call of the medium of this communication terminal. Thereby for example, even when one or more of the plural communication terminals represented by the changed-terminal/media information is/are unavailable, in a case where it is desirable to determine an available residual communication terminal as a communication terminal to be incorporated into the call, there is no necessity of storing, in the terminal/media information storing part, the changed-terminal/media information that defines the available residual communication terminal. And thus, it is possible to suppress the information content to be stored in the terminal/media information storing part.

In the communication control apparatus according to the embodiment of the present invention, it is preferable that the terminal control part further generates call-relevant information that relates to a call at a communication terminal having the call, among the communication terminals belonging to the available-terminal group;

the terminal/media information storing part retains the call-relevant information in association with the terminal/media information and the changed-terminal/media information;

when the communication terminal represented by the call-status information and the medium of the communication terminal match the communication terminal represented by the terminal/media information and the medium of the communication terminal and when the call-relevant information generated by the terminal control part matches the call-relevant information stored in the terminal/media information storing part, and further when the communication terminal represented by the changed-terminal/media information is included in the communication terminals represented by the available-terminal information, the terminal/media selecting part determines the communication terminal represented by the changed-terminal/media information as a communication terminal to be incorporated into the call of medium of the communication terminal.

According to the above-mentioned configuration, the terminal control part generates further call-relevant information. Here, the call-relevant information denotes information relevant to a call. Examples of the call-relevant information include a receiver telephone number, an originator telephone number, a call-start time, a call duration and the like. When the call-status information matches the terminal/media information and when the call-relevant information generated by the terminal control part matches the call-relevant information stored in the terminal/media information storing part, and further when the communication terminal represented by the changed-terminal/media information is included in the communication terminals represented by the available-terminal information, the terminal/media selecting part determines the communication terminal represented by the changed-terminal/media information as a communication terminal to be incorporated into the call of medium of this communication terminal. Thereby it is possible to consider not only the call status of the medium of this communication terminal but also the status of call-relevant information relating to the call of the medium of the communication terminal. And thus, it is possible to determine flexibly a communication terminal to be incorporated into the call, in accordance with the call status of the medium of the communication terminal and also the status of call-relevant information.

It is preferable that the communication control apparatus according to the embodiment of the present invention includes further an integrated terminal information storing part that stores integrated terminal information representing a plurality of communication terminals integrally available for a user, the terminal/media selecting part extracts, from the integrated terminal information storing part, the integrated terminal information including the communication terminal represented by the call-status information, and in a case where the communication terminal represented by the changed-terminal/media information is included in the communication terminals represented by the extracted integrated terminal information, then the terminal/media selecting part determines the communication terminal represented by the changed-terminal/media information, as a communication terminal to be incorporated into the call of the medium of the communication terminal.

According to the above-mentioned configuration, the terminal/media selecting part extracts integrated terminal information including the communication terminal represented by the call-status information, from the integrated terminal information storing part. In a case where the communication terminal represented by the changed-terminal/media information is included in the communication terminals represented by the extracted integrated terminal/media information, the terminal/media selecting part determines the communication terminal represented by the changed-terminal/media information as the communication terminal to be incorporated into the call of the medium of this communication terminal. Thereby it is possible to determine a communication terminal to be incorporated into a call, among the communication terminals represented by the integrated terminal information. And thus, for example, when a user is not present in the vicinity of a certain communication terminal, even if the above-mentioned event occurs due to an operation of this communication terminal by a third person, the terminal/media selecting part does not determine this communication terminal as a communication terminal to be incorporated into a call, unless this communication terminal is defined as the integrated terminal information. Namely the user defines in advance a plurality of communication terminals available integrally as integrated terminal information, so that it is possible to prevent incorporation of a call into a communication terminal not expected by the user.

A communication control program according to the embodiment of the present invention is allowed a computer to manage an available-terminal group including a plurality of communication terminals available for a user among a plurality of communication terminals, and to control a call between the communication terminal belonging to the available-terminal group and a communication terminal of another user, thereby functioning as a single and virtual terminal for combining the available-terminal groups with respect to the communication terminal of the other user, the communication control program allows the computer to execute a terminal control process of generating available-terminal information representing a communication terminal belonging to the available-terminal group and a call-status information representing the communication terminal having the call among the communication terminals belonging to the available-terminal group and the medium of the communication terminal;

wherein the computer is capable of accessing the terminal/media information storing part that stores the terminal/media information representing a communication terminal and a medium of the communication terminal and also a changed-terminal/media information representing a communication terminal to be changed from the communication terminal represented by the terminal/media information and a medium of the communication terminal to be changed, and, upon detecting occurrence of an event regarding a communication control sequence or an event regarding a terminal environmental change of the communication terminal, when the communication terminal represented by the call-status information and the medium of the communication terminal match the communication terminal represented by the terminal/media information and the medium of the communication terminal and further when the communication terminal represented by the changed-terminal/media information is included in the communication terminals represented by the available-terminal information, then the communication control program allows the computer to execute further a terminal/media selection process to determine the communication terminal represented by the changed-terminal/media information as a communication terminal to be incorporated into the call of the medium of the communication terminal.

The communication control program according to the embodiment of the present invention is as effective as the above-described communication control apparatus.

As described above, the communication control apparatus and the communication control program of the present invention have an effect of allowing a flexible determination of a communication terminal to be incorporated into a call in accordance with a call status of a medium of a communication terminal.

The following is a detailed description of more specific embodiments of the present invention, with reference to the accompanying drawings.

Embodiment 1

Figure 2:
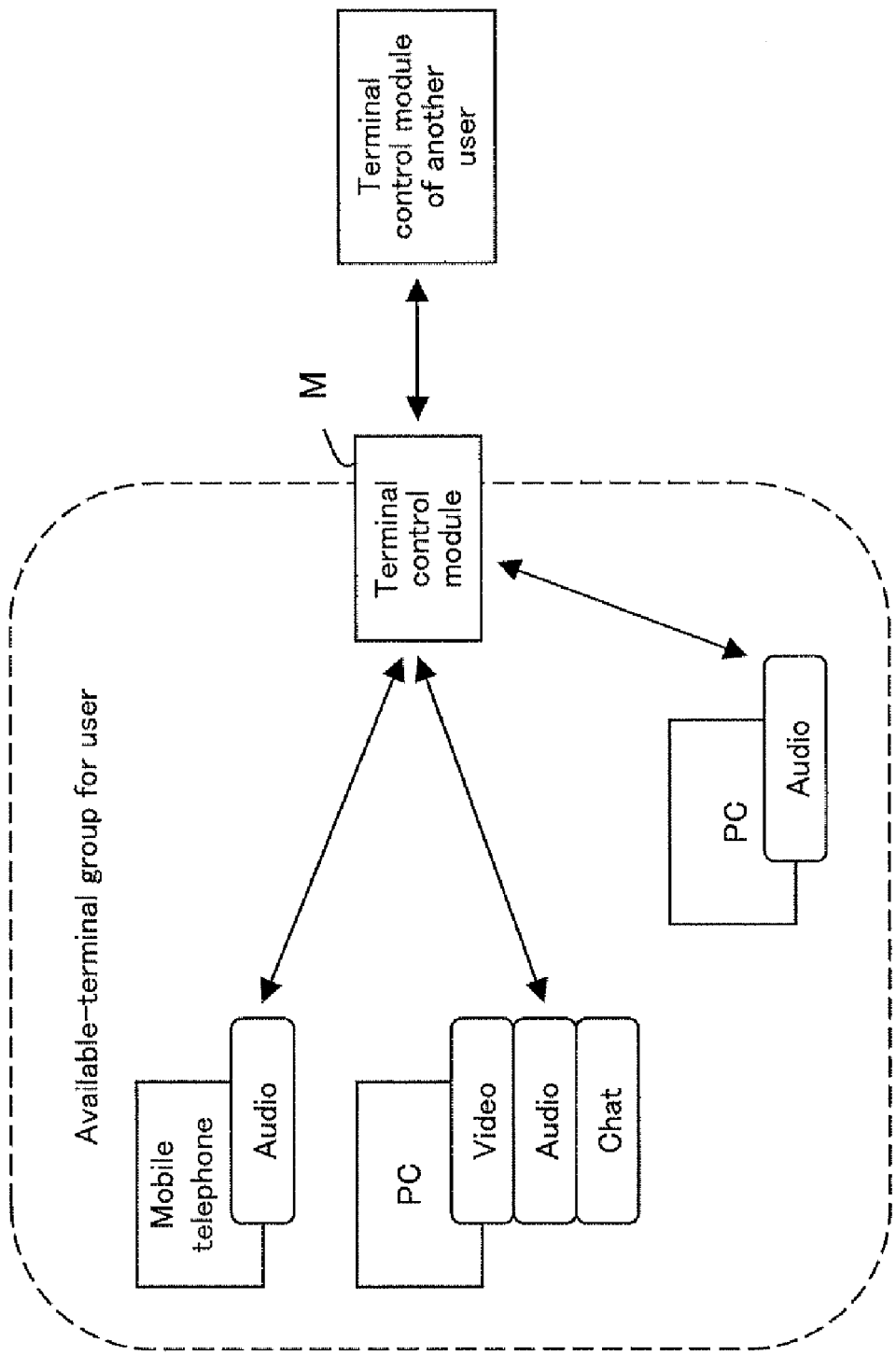
FIG. 2 is a block diagram showing a basic configuration of a ubiquitous communication system according to the first embodiment of the present invention.

FIG. 2 is a block diagram showing a basic configuration of a ubiquitous communication system according to the present embodiment. Namely in the ubiquitous communication system according to the present embodiment, an available-terminal group for every user is registered in advance. And one terminal control module M is set for an available-terminal group for a user. Here, the available-terminal group denotes a group of terminals including a plurality of communication terminals available for a user among a plurality of communication terminals. The terminal control module M has a function of integrating and managing the communication conditions or the like of various communication terminals included in the available-terminal group. Namely one terminal control module M is provided for every user, and all communications between the communication terminal of this user and a communication terminal of another user are executed through this terminal control module M.

The terminal control module M is present within any communication terminals belonging to the available-terminal group for every user, or within an instrument accessible from the available-terminal group (for example, a communication control instrument such as a switching device, a home server, a SIP server and the like). Namely a terminal or an instrument prepared by installing the terminal control module M composes an embodiment of the communication control apparatus of the present invention. In other words, the communication control apparatus is provided by operating a terminal or CPU of an instrument in accordance with a program of the terminal control module M.

[Configuration of Communication Control Apparatus]

FIG. 1 is a block diagram showing a schematic configuration of a communication control apparatus 1 according to the present embodiment. Namely the communication control apparatus 1 according to the present embodiment includes a terminal control part 11, a terminal/media selecting part 12, and a session control part 13, which are embodied by installing the terminal control module M. Here, a terminal/media information storing part 12a of the terminal/media selecting part 12 is embodied by a built-in memory (RAM, ROM or the like) in the communication control apparatus 1 or a memory accessible from this communication control apparatus 1. In the present embodiment, five communication terminals Ta-Te exist. The communication terminal Ta denotes a user's mobile telephone; the communication terminals Tb, Tc and Te denote personal computers of the user (shown as 'PC' in FIG. 1); and the communication terminal Td denotes a fixed telephone of the user. IDa-IDe denote the terminal IDs of the communication terminals Ta-Te. The terminal ID is for example an identification number for providing one meaning to each of the communication terminals Ta-Te, such as IP address and MAC address.

The terminal control part 11 controls the plural communication terminals belonging to the available-terminal group. In the example as shown in FIG. 1, the terminal control part 11 controls three communication terminals Ta-Tc belonging to the available-terminal group among the five communication terminals Ta-Te. Namely as the terminal ID (IDa-IDc) of the communication terminals Ta-Tc are registered at the terminal control part 11, the terminal control part 11 can control the communication terminals Ta-Tc as available-terminals.

Here, when the communication terminal becomes available by for example turning ON the power source or by disconnecting the screen saver, this communication terminal notifies a registration request to the terminal control part 11. The terminal control part 11 registers the terminal ID of the communication terminal in accordance with the registration request. To the contrary when the communication terminal becomes unavailable as a result of for example turning OFF the power source or by activating the screen saver, this communication terminal notifies a deletion request to the terminal control part 11. The terminal control part 11 deletes the terminal ID of the communication terminal in accordance with the deletion request. Thereby the terminal ID of the terminal control part 11 will be kept updated constantly Here, the decision whether the communication terminal becomes available or not can be made depending on the ON/OFF of the electric power source and activation/cancellation of screen saver. Alternatively the decision can be made depending on activation of the application software, a registration of a user situated at his own place in a seat reservation (schedule) software, and the like.

The terminal control part 11 generates "available-terminal information" representing communication terminals belonging to the available-terminal group, on the basis of the terminal IDs (IDa-IDc) registered in the terminal control part 11. FIG. 3 shows an example of a data structure of the available-terminal information generated by the terminal control part 11. In the example as shown in FIG. 3, the terminal control part 11 generates the terminal ID "IDa" of the communication terminal Ta, the terminal ID "IDb" of the communication terminal Tb, and the terminal ID "IDc" of the communication terminal Tc, as the available-terminal information to form one message.

In addition to the above-mentioned terminal IDs, the terminal control part 11 retains the titles and properties of a media that can be handled by every communication terminal, as media information. Namely the communication terminal notifies to the terminal control part 11 the titles and properties of media that can be handled by the communication terminals, together with the above-mentioned registration request. Thereby the media information of the terminal control part 11 will be updated constantly accompanying the state of the communication terminal. Here, the media information includes not only the information representing the media types such as video and audio, but also information such as media codec information like MPEG4 and G.711, a use band, an IP address to/from which a media stream is sent/received, and a port number. In the present embodiment, audio media information is indicated as Ms, and video media information is indicated as Mv.

The terminal control part 11 generates "call-status information" representing a communication terminal having a call among communication terminals belonging to an available-terminal group and a medium of this communication terminal. FIG. 4 shows an example of a data structure of call-status information generated by the terminal control part 11. In the example as shown in FIG. 4, the terminal control part 11 generates the terminal ID "IDa" of the communication terminal Ta having a call among the communication terminals Ta-Tc belonging to the available-terminal group and audio media information "Ms" of the communication terminal Ta, as call-status information to form one message. Namely the call-status information as shown in FIG. 4 represent a status where the communication terminal Ta among the communication terminals Ta-Tc belonging to the available-terminal group is in communications via "audio".

The present invention is not limited to the present embodiment where the terminal control part 11 generates the above-described available-terminal information and the call-status information at realtime, but the available-terminal information and the call-status information can be generated at a time any change occurs in the available-terminal information and the call-status information, without any particular limitations.

The terminal/media selecting part 12 monitors a communication control event so as to acquire the available-terminal information and the call-status information generated by the terminal control part 11, upon detecting occurrence of a communication control event, and it determines a communication terminal and a medium to be used for communications with another user, on the basis of the thus acquired available-terminal information and call-status information. For this purpose, the terminal/media selecting part 12 has a terminal/media information storing part 12a.

The communication control event includes an event relating to a communication control sequence and an event relating to a terminal environmental change of a communication terminal. An example of the event relating to the communication control sequence is a call request. The call request is classified into two types, i.e., a case of a call from another user and a case of a call from any communication terminal of an available-terminal group of the original user. The above-mentioned call request as an event relating to the communication control sequence can be replaced by a receiving response with respect to the call request. An example of the event relating to the terminal environmental change of the communication terminal is a registration request notified by a new communication terminal that is added to an available-terminal group of a user.

The terminal/media information storing part 12a stores "terminal/media information" representing a communication terminal and a medium of this communication terminal and "changed-terminal/media information" representing a communication terminal to be changed from the communication terminal represented by the terminal/media information and a medium of this communication terminal to be changed. Further, the terminal/media information storing part 12a retains a priority in association with the terminal/media information and the changed-terminal/media information. FIG. 5 shows an example of a data structure of the terminal/media information storing part 12a. In the example as shown in FIG. 5, "terminal/media information", "priority" and "changed-terminal/media information" are stored in the terminal/media information storing part 12a. Audio media information Ms and video media information Mv are associated with the terminal/media information. Further, audio media information Ms and video media information Mv are associated with the changed-terminal/media information. The terminal/media information, the priority and the changed-terminal/media information as shown in FIG. 5 are preset by a manager of the communication control apparatus 1.

FIG. 5 shows an example that the terminal/media information storing part 12a stores the terminal/media information, the priority and the changed-terminal/media information in a table format, but this is not the sole example. Namely the storage format can be decided arbitrarily. Further, although FIG. 5 refers to an example that the terminal/media information storing part 12a stores the priority the priority is not necessarily stored. However, as shown in FIG. 5, if the terminal/media information storing part 12a stores the priority the communication terminal to be incorporated preferentially into a call can be determined.

Hereinafter, procedures for determining a communication terminal and a medium by the terminal/media selecting part 12 will be described in detail.

Upon detecting occurrence of the above-mentioned communication control event, the terminal/media selecting part 12 acquires the available-terminal information and the call-status information that have been generated by the terminal control part 11. The terminal/media selecting part 12 decides whether the communication terminal represented by the call-status information and the medium of this communication terminal match or not the communication terminal represented by the terminal/media information stored in the terminal/media information storing part 12a and the medium of this communication terminal. In the present embodiment, the terminal/media selecting part 12 decides whether the terminal ID "IDa" represented by the call-status information and the media information "Ms" (see FIG. 4) match or not the media information of the terminal ID of a communication terminal represented by the terminal/media information and the medium of this communication terminal. Here, since the mark "-" in the terminal/media information in FIG. 5 indicates that all of the data match, the terminal/media selecting part 12 decides that the terminal/media information in the first row R1 and the terminal/media information in the second row R2 match.

And the terminal/media selecting part 12 refers to the priority "5" associated with the terminal/media information in the first row R1 and the priority "4" associated with the terminal/media information in the second row R2. In the present embodiment, the priority is expressed in the five stages of 1-5, and the priority becomes higher as the numerical figure is bigger. That is, "1" denotes the lowest priority and "5" denotes the highest priority. Therefore, the terminal/media selecting part 12 selects the terminal/media information having the higher priority in the first row R1, among the pieces of terminal/media information in the first row R1 and the second row R2.

Next, the terminal/media selecting part 12 refers to the changed-terminal/media information in the first row R1 corresponding to the selected terminal/media information in the first row R1. The terminal/media selecting part 12 decides whether all of the communication terminals represented by the changed-terminal/media information in the first row R1 are included or not in the communication terminals represented by the available-terminal information. In the present embodiment, the terminal/media selecting part 12 decides whether all of the terminal ID "IDb" and the terminal ID "IDc" represented by the changed-terminal/media information in the first row R1 are included or not in the terminal ID "IDa", the terminal ID "IDb" and the terminal ID "IDc" (see FIG. 3) represented by the available-terminal information. Here, the terminal/media selecting part 12 decides that the communication terminals represented by the changed-terminal/media information in the first row R1 are included in the communication terminals represented by the available-terminal information.

Thereby the terminal/media selecting part 12 determines the communication terminal Tb of the terminal ID "IDb" represented by the changed-terminal/media information in the first row R1, as a communication terminal to be incorporated into an audio call in place of the communication terminal Ta of the terminal ID "IDa" represented by the terminal/media information in the first row R1. Furthermore, the terminal/media selecting part 12 determines the communication terminal Tc of the terminal ID "IDc" represented by the changed-terminal/media information in the first row R1, as a communication terminal to be incorporated into a video call. The terminal/media selecting part 12 generates the determined information as selection information. FIG. 6 shows an example of a data structure of the selection information generated by the terminal/media selecting part 12. In the example as shown in FIG. 6, the terminal/media selecting part 12 generates the terminal ID "IDb" of the communication terminal Tb, the audio media information "Ms" of this communication terminal Tb, the terminal ID "IDc" of the communication terminal Tc and the video media information "Mv" of this communication terminal Tc, as the selection information to form one message. The terminal/media selecting part 12 outputs the thus generated selection information to the session control part 13.

Assuming that not all of the communication terminals represented by the changed-terminal/media information in the first row R1 are included in the communication terminals represented by the available-terminal information, the terminal/media selecting part 12 refers to the changed-terminal/media information in the second row having the second highest priority. The terminal/media selecting part 12 decides whether the communication terminal represented by the changed-terminal/media information in the second row R2 is included in the communication terminals represented by the available-terminal information. Subsequently the terminal/media selecting part 12 repeats this procedure.

The session control part 13 establishes a call of a medium of a communication terminal represented by the selection information, between the communication terminal represented by the selection information and the other user. In the present embodiment, the session control part 13 first disconnects an audio call established between the communication terminal Ta and the other user. Then, the session control part 13 newly establishes an audio call between the communication terminal Tb and the other user. Further, the session control part 13 newly establishes a video call between the communication terminal Tc and the other user. Thereby in the ubiquitous communication system according to the present embodiment, the communication terminal Ta having an audio call is changed to the communication terminal Tb to be incorporated into an audio call and the communication terminal Tc to be incorporated into a video call.

The present invention is not limited to the above-described example where the session control part 13 disconnects the audio call established between the communication terminal Ta and another user and then newly establishes an audio call between the communication terminal Tb and the other user. Namely an inverted procedure can be applied similarly. That is, the session control part 13 can establish newly an audio call between the communication terminal Tb and the other user, and then disconnect the audio call that has been established between the communication terminal Ta and the other user.

Furthermore, it is possible that, when there is an instruction from the user, the session control part 13 establishes a call of a medium of a communication terminal represented by the selection information between the communication terminal represented by the selection information and the other user. Specifically in a case where selection information is outputted from the terminal/media selecting part 12, the session control part 13 sends this selection information to an arbitrary communication terminal of the user. The communication terminal presents a communication terminal represented by the selection information and a medium of this communication terminal. The user confirms the presented communication terminal and the medium, and provides instructions to the communication terminal by using an input means. Upon accepting the instruction from the user, the communication terminal sends information representing the accepted instruction to the session control section 13 of the communication control apparatus 1. Upon receiving the information representing the instruction, the session control part 13 establishes a call of medium of the communication terminal represented by the selection information, between the communication terminal represented by the selection information and the other user. Thereby even in a case of occurrence of the above event, the session control part 13 does not establish a call of a medium of a communication terminal between the communication terminal represented by the selection information and the other user, without any instructions from the user. Therefore, the user can select whether or not to establish a call, depending on the user's situation.

[Operation of Communication Control Apparatus]

Next, operations of the communication control apparatus 1 configured as mentioned above will be described with reference to FIG. 7.

Figure 7:
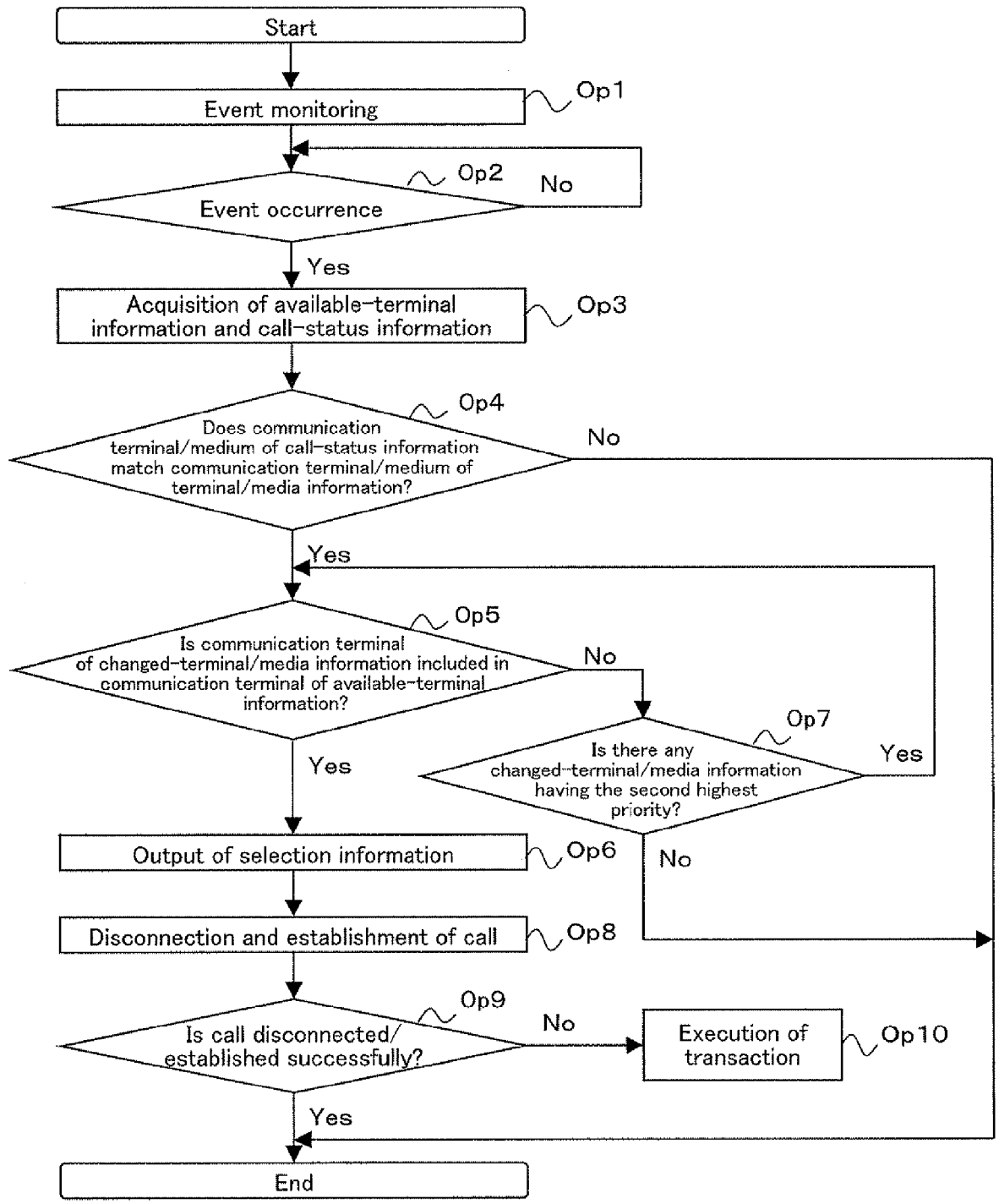
FIG. 7 is a flow chart showing schematically operations of the communication control apparatus.

FIG. 7 is a flow chart showing schematically operations of the communication control apparatus 1. Namely as shown in FIG. 7, the terminal/media selecting part 12 monitors continuously the communication control event (step Op1). When the terminal/media selecting part 12 detects occurrence of any communication control event (YES in step Op2), the terminal/media selecting part 12 acquires the available-terminal information and the call-status information (step Op3) that have been generated by the terminal control part 11. When the terminal/media selecting part 12 does not detect occurrence of any communication control event (NO in step Op2), it returns to the step Op2.

And in a step Op4, the terminal/media selecting part 12 decides whether or not the communication terminal represented by the call-status information and the medium of this communication terminal match the communication terminal represented by the terminal/media information stored in the terminal/media information storing part 12*a* and the medium of this communication terminal. When deciding that the communication terminal represented by the call-status information and the medium of this communication terminal match the communication terminal represented by the terminal/media information and the medium of this communication terminal (YES in step Op4), the terminal/media selecting part 12 proceeds to a step Op5. When deciding that the communication terminal represented by the call-status information and the medium of this communication terminal do not match the communication terminal represented by the terminal/media information and the medium of this communication terminal (NO in step Op4), the terminal/media selecting part 12 ends the procedure in FIG. 7.

And in the step Op5, the terminal/media selecting part 12 decides whether all of the communication terminals represented by the changed-terminal/media information are included or not in the communication terminals represented by the available-terminal information. When deciding that all of the communication terminals represented by the changed-terminal/media information are included in the communication terminals represented by the available-terminal information (YES in step Op5), the terminal/media selecting part 12 determines the communication terminal represented by the changed-terminal/media information as the communication terminal to be incorporated into the call of the medium of this communication terminal. The terminal/media selecting part 12 generates the thus determined information, as selection information. The terminal/media selecting part 12 outputs the thus generated selection information to the session control part 13 (step Op6).

When deciding that not all of the communication terminals represented by the changed-terminal/media information are included in the communication terminals represented by the available-terminal information (NO in step Op5), the terminal/media selecting part 12 proceeds to a step Op7, and decides whether there is any changed-terminal/media information having the second highest priority. When deciding that there is changed-terminal/media information having the second highest priority (YES in step Op7), the terminal/media selecting part 12 returns to the step Op5, and decides whether the communication terminal represented by this changed-terminal/media information is included or not in the communication terminals represented by the available-terminal information. When deciding that there is no changed-terminal/media information having the second highest priority (NO in step Op 7), the terminal/media selecting part 12 ends the procedure in FIG. 7.

And the session control part 13 disconnects the call of the medium established between the communication terminal represented by the terminal/media information and the other user, and newly establishes a call of a medium between a communication terminal represented by the changed-terminal/media information and the other user (step Op8). The session control part 13 then decides whether the disconnection and establishment of call has succeeded or not. When deciding that the disconnection and establishment of call has succeeded (YES in step Op9), the session control part 13 ends the procedure in FIG. 7. When deciding that the disconnection and establishment of call has not succeeded (NO in step Op9), the session control part 13 executes a procedure for ending transaction (step Op 10). Here, the term 'transaction' denotes exchanging a series of messages with the terminal for performing disconnection and establishment of call. Since it remains unfinished in a case where the disconnection and establishment of call does not succeed, the subsequent and later procedures of disconnection and establishment of call may be hindered. Since this problem can be avoided by executing the procedure for ending transaction, call consistency is assured in the ubiquitous communication system according to the present embodiment.

As described above, in the communication control apparatus 1 according to the present embodiment, the terminal control part 11 generates the available-terminal information and the call-status information. The available-terminal information denotes information representing a communication terminal belonging to an available-terminal group. The call-status information denotes information representing a communication terminal having a call among communication terminals belonging to the available-terminal group and a medium of this communication terminal. Upon detecting occurrence of the above-mentioned event, when a communication terminal represented by the call-status information and the medium of this communication terminal match a communication terminal represented by the terminal/media information stored in the terminal/media information storing part 12a and the medium of the communication terminal and when the communication terminal represented by the changed-terminal/media information stored in the terminal/media information storing part 12a is included in the communication terminals represented by the available-terminal information, the terminal/media selecting part 12 determines the communication terminal represented by the changed-terminal/media information, as the communication terminal to be incorporated into the call of a medium of this communication terminal. Thereby the session control part 13 can establish a call of a medium of a communication terminal determined by the terminal/media selecting part 12, between the communication terminal determined by the terminal/media selecting part 12 and a communication terminal of the other user. In this manner, it is possible to determine flexibly a communication terminal to be incorporated into a call, in accordance with a status of call of a medium of the communication terminal.

Hereinafter, operations of the ubiquitous communication system according to the present embodiment will be described with reference to a more specific example shown in FIGS. 8A-8C and 9A, 9B.

Figure 8A:
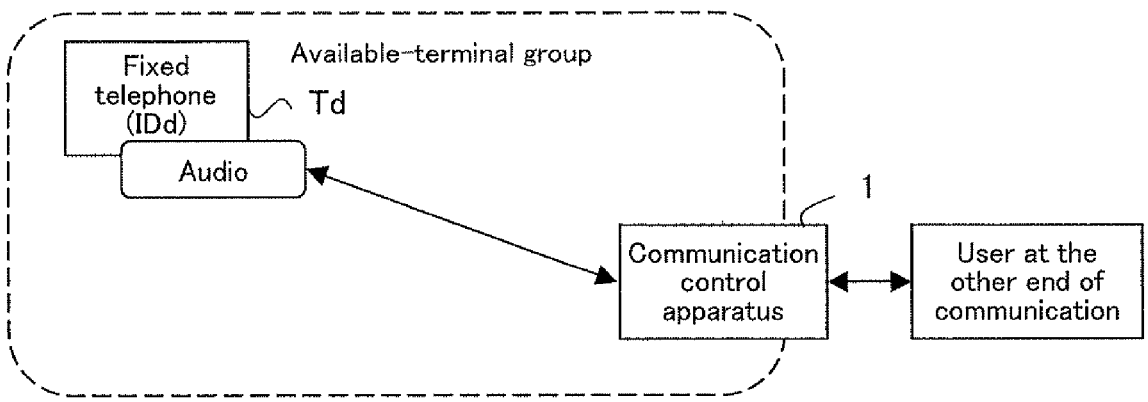
FIGS. 8A-8C are diagrams for specifying operations of a ubiquitous communication system according to the first embodiment.
Figure 8B:
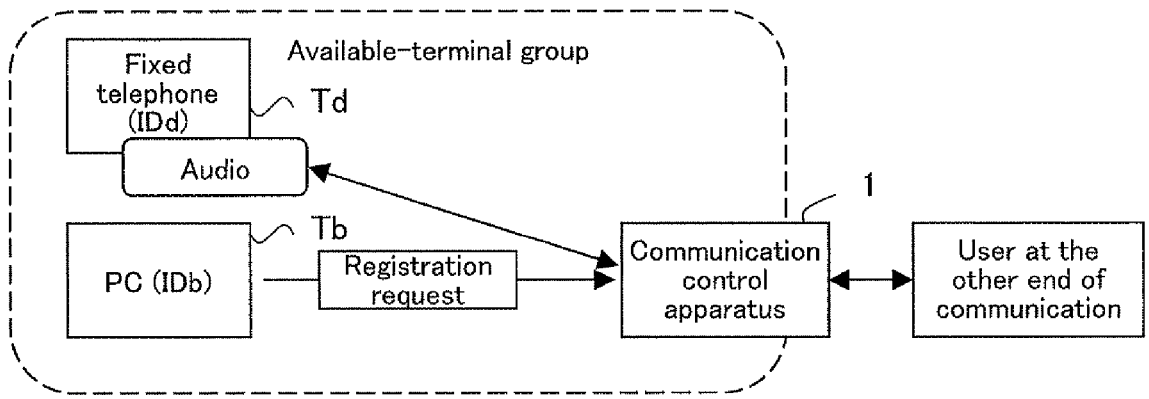
Figure 8C:
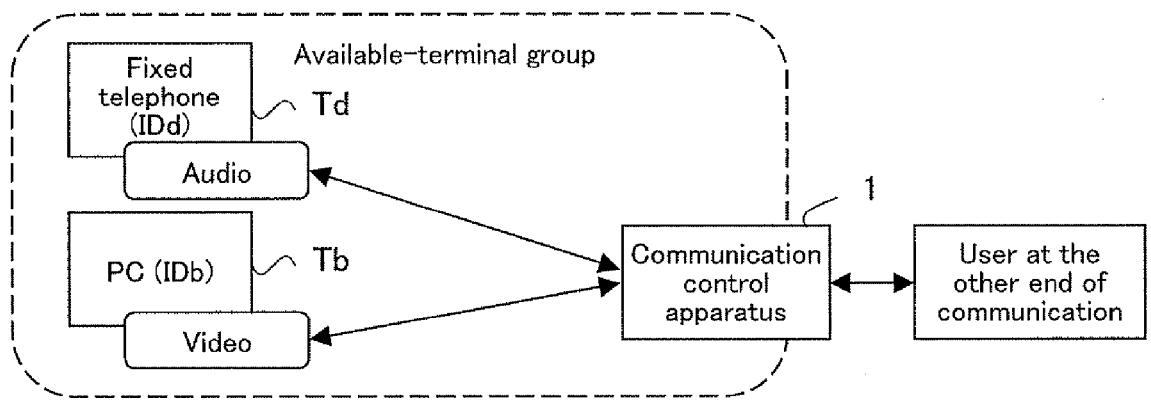

First, as shown in FIG. 8A, it is assumed that the terminal ID "IDd" of the communication terminal Td is registered in the available-terminal group, and that this communication terminal Td communicates through audio with another user via the communication control apparatus 1. Here, as shown in FIG. 8B, for example, in a case where the communication terminal Tb becomes available by turning ON the power source of the communication terminal Tb, the communication terminal Tb notifies a registration request to the communication control apparatus 1. The communication control apparatus 1 registers the terminal ID "IDb" of the communication terminal Tb in accordance with the registration request. Upon detecting the registration request as a communication control event, the communication control apparatus 1 refers to the terminal/media information storing part 12a of the communication control apparatus 1 (see FIG. 5) so as to determine the communication terminal and the medium to be used for communications with the other user. Specifically, as having an audio call between the communication terminal Ta and the other user, the communication control apparatus 1 decides that the terminal/media information in the third row R3 of the terminal/media information storing part 12a matches. Moreover, the communication control apparatus 1 decides that, since the communication terminal Td and the communication terminal Tb are included in the available-terminal group, all of the terminal ID "IDd" and the terminal ID "IDb" represented by the changed-terminal/media information in the third row R3 are included in the terminal ID "IDd" and terminal ID "IDb" represented by the available-terminal information. As a result, as shown in FIG. 8C, the communication control apparatus 1 establishes newly a video call between the communication terminal Tb and the other user, in addition to the audio call established between the communication terminal Td and the other user.

Figure 9A:
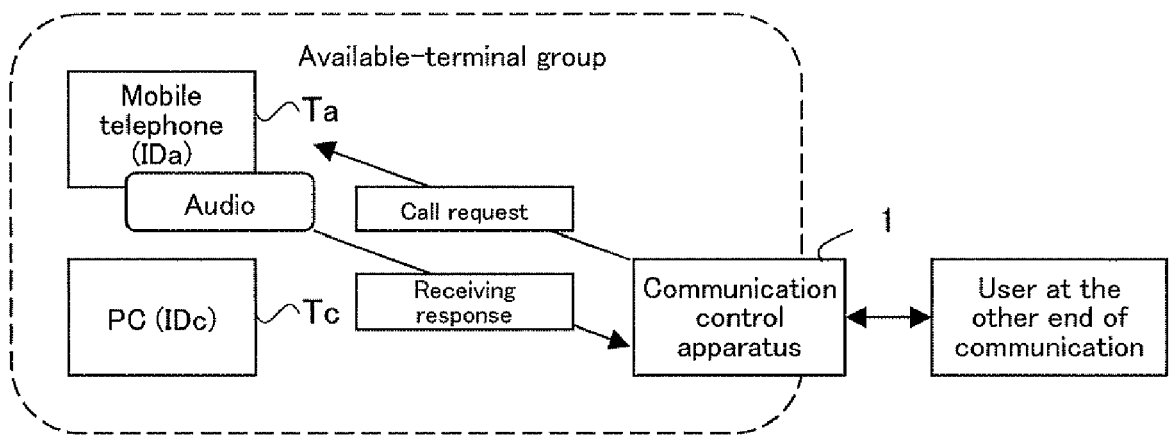
FIGS. 9A and 9B are diagrams for specifying operations of the ubiquitous communication system according to the first embodiment.
Figure 9B:
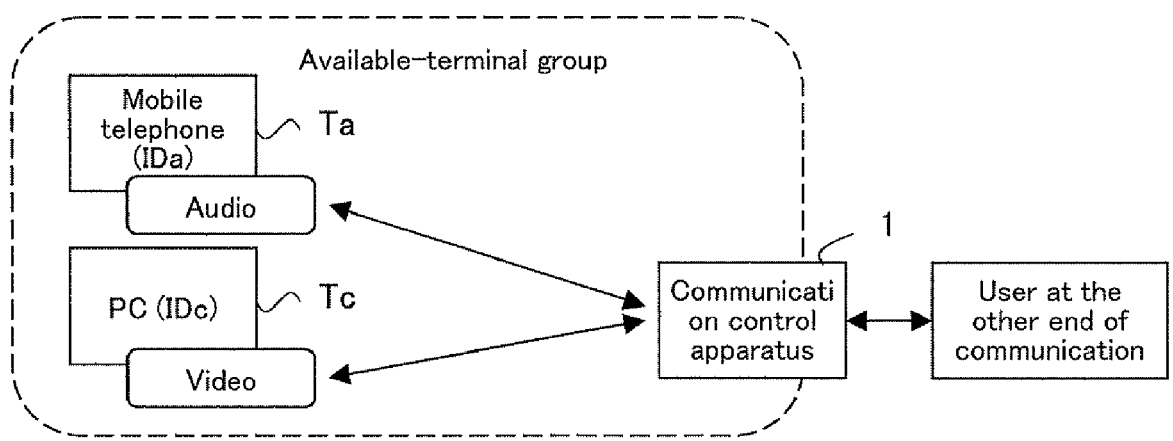

Next, as shown in FIG. 9A, it is assumed that the terminal ID "IDa" of the communication terminal Ta and the terminal ID "IDc" of the communication terminal Tc are registered in the available-terminal group, and that this communication terminal Ta receives a call request from the other user via the communication control apparatus 1. At this time, when the user at the communication terminal Ta carries out a receiving operation based on the call request, the communication terminal Ta notifies a receiving response to the communication control apparatus 1. Upon detecting the receiving response as a communication control event, the communication control apparatus 1 refers to the terminal/media information storing part 12a of the communication control apparatus 1 (see FIG. 5) so as to determine a communication terminal and a medium used for communications with the other user. Specifically since the user at the communication terminal Ta that can handle an audio call carries out a receiving operation, the communication control apparatus 1 decides that the terminal/media information in the first row R1 and the terminal/media information in the second row R2 of the terminal/media information storing part 12a match. The communication control apparatus 1 selects terminal/media information in the first row R1 having the high priority among the terminal/media information in the first row R1 and in the second row R2. Further, since the communication terminal Ta and the communication terminal Tc are included in the available-terminal group, the communication control apparatus 1 decides that not all of the terminal ID "IDb" and the terminal ID "IDc" represented by the changed-terminal/media information in the first row R1 are included in the terminal ID "IDa" and the terminal ID "IDc" represented by the available-terminal information. Therefore, the communication control apparatus 1 refers to the changed-terminal/media information in the second row R2 having the second highest priority. The communication control apparatus 1 decides that all of the terminal ID "IDa" and the terminal ID "IDc" represented by the changed-terminal/media information in the second row R2 are included in the terminal ID "IDa" and the terminal ID "IDc" represented by the available-terminal information. As a result, as shown in FIG. 9B, the communication control apparatus 1 establishes newly a video call between the communication terminal Tc and the other user, in addition to the audio call established between the communication terminal Ta and the other user.

Embodiment 2

Figure 10:
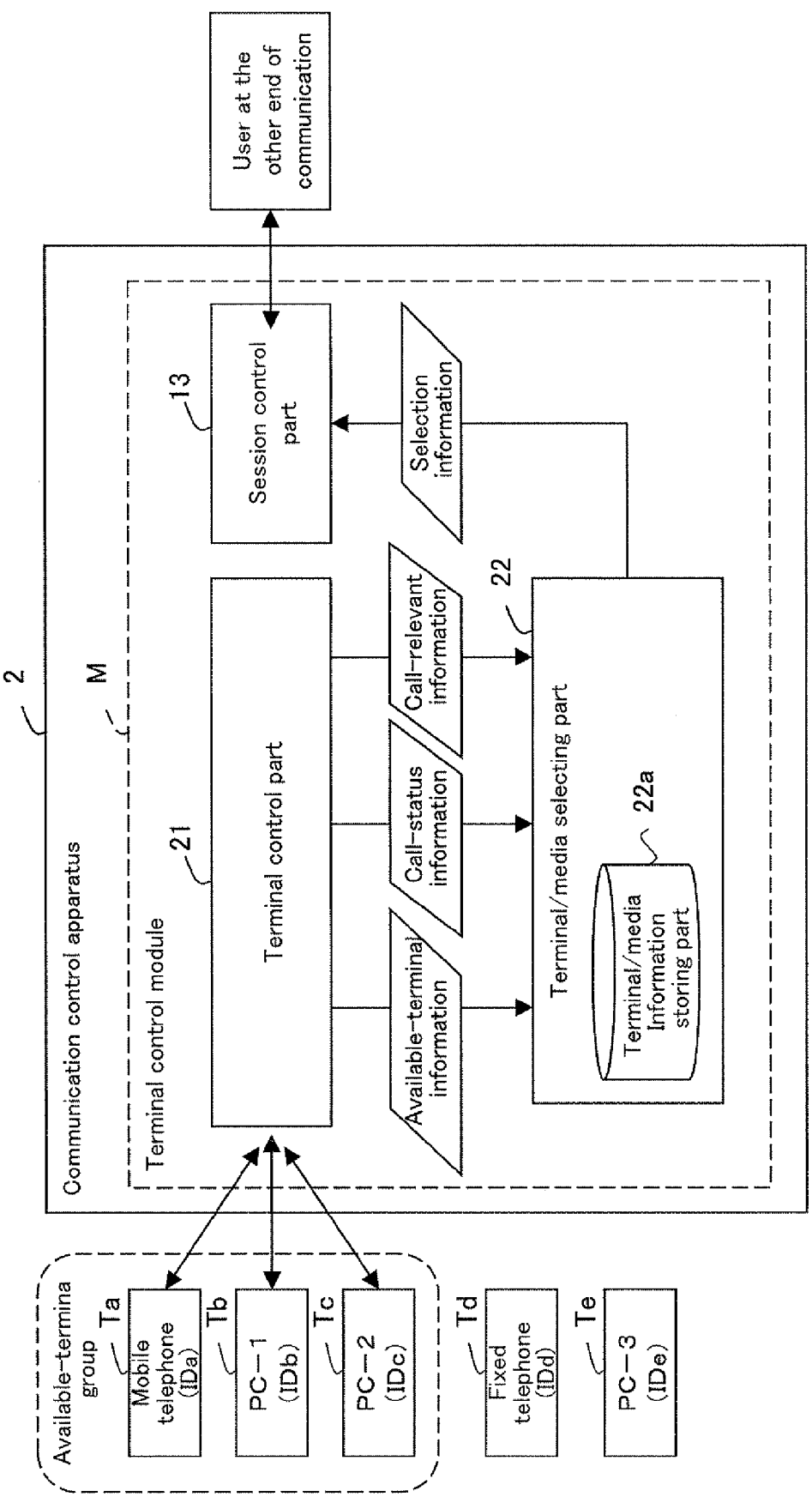
FIG. 10 is a block diagram showing a schematic configuration of a communication control apparatus according to a second embodiment of the present invention.

FIG. 10 is a block diagram showing a schematic configuration of a communication control apparatus 2 according to the present embodiment. The communication control apparatus 2 according to the present embodiment includes a terminal control part 21 and a terminal/media selecting part 22 in place of the terminal control part 11 and the terminal/media selecting part 12 shown in FIG. 1. In FIG. 10, components analogous to those in FIG. 1 are assigned with identical reference numerals in order to avoid the duplication of explanations.

In addition to the function of the terminal control part 11 as shown in FIG. 1, the terminal control part 21 has a function of generating "call-relevant information" that relates to a call, at the communication terminal having the call among the communication terminals belonging to the available-terminal group. Here, examples of the call-relevant information include a receiver telephone number, an originator telephone number, a call-start time, a call duration and the like. In the present embodiment, the terminal control part 21 generates call-relevant information relating to a call, at the communication terminal Ta having this call, among the communication terminal Ta, the communication terminal Tb and communication terminal Tc belonging to the available-terminal group. FIG. 11 shows an example of a data structure of call-relevant information generated by the terminal control part 21. In the example as shown in FIG. 11, the terminal control part 21 generates an originator telephone number "090-1111-2222", a receiver telephone number "090-1234-5678", a call-start time "08:45:12" (eight forty-five, twelve seconds), a call duration "5:00" (5 minutes), as call-relevant information to form one message. The present invention is not limited particularly to the present embodiment where the terminal control part 21 generates the above-mentioned call-relevant information at realtime, but the call-relevant information can be generated at any time of occurrence of a change.

By monitoring the communication control event, upon detecting occurrence of a communication control event, the terminal/media selecting part 22 acquires available-terminal information, call-status information and call-relevant information that have been generated by the terminal control part 21, and based on the thus acquired available-terminal information, call-status information and call-relevant information, determines a communication terminal and a medium to be used for communications with the other user. Therefor, the terminal/media selecting part 22 has a terminal/media information storing part 22a in place of the terminal/media information storing part 12a shown in FIG. 1.

The terminal/media information storing part 22a stores call-relevant information in addition to the information stored by the terminal/media information storing part 12a shown in FIG. 1 (see FIG. 5 for the data structure). FIG. 12 shows an example of a data structure of the terminal/media information storing part 22a. As shown in FIG. 12, in the first row R1 of the terminal/media information storing part 12a, the receiver telephone number "090-1234-5678" and the call duration "5:00" (5 minutes) as the call-relevant information are stored further. In the second row R2, the receiver telephone number "090-1234-5555" and the call duration "3:00" (3 minutes) as the call-relevant information are stored further. In the third row R3, the originator telephone number "090-8765-4321" as the call-relevant information is stored further. And in the fourth row R4, the call-start time "12:45:00" (twelve forty-five, zero seconds) and the call duration "1:30" (1 minute 30 seconds) are stored further.

The present invention is not limited to the example in FIG. 12 where the terminal/media information storing part 22a stores the terminal/media information, the call-relevant information, the priority and the changed-terminal/media information in a table format. Namely the storage format is selected arbitrarily.

Hereinafter, a procedure for determining a communication terminal and a medium by the terminal/media determining part 22 will be described in detail.

Upon detecting occurrence of the above-mentioned communication control event, the terminal/media selecting part 22 acquires the available-terminal information, a call-status information, and a call-relevant information that have been generated by the terminal control part 21. First, the terminal/media selecting part 22 decides whether the communication terminal represented by the call-status information and the medium of this communication terminal match or not the communication terminal represented by the terminal/media information stored in the terminal/media information storing part 22a and the medium of this communication terminal. In the present embodiment, it is assumed similarly to Embodiment 1, that the terminal/media selecting part 22 decides that the terminal/media information in the first row R1 and the terminal/media information in the second row R2 match.

And the terminal/media selecting part 22 refers to the priority "5" associated with the terminal/media information in the first row R1 and the priority "4" associated with the terminal/media information in the second row R2. Here, among the pieces of terminal/media information in the first row R1 and in the second row R2, the terminal/media selecting part 12 selects the terminal/media information in the first row R1 having a higher priority.

And the terminal/media selecting part 22 decides whether the call-relevant information acquired from the terminal control part 21 matches or not the call-relevant information stored in the terminal/media information storing part 22a. In the present embodiment, the terminal/media selecting part 22 decides whether the originator telephone number "090-1111-2222", the receiver telephone number "090-1234-5678", the call-start time "08:45:12" and the call duration "5:00", which are represented by the call-relevant information acquired from the terminal control part 21 (see FIG. 11) match the call-relevant information in the first row R1. Since "-" concerning the call-relevant information in FIG. 12 indicates that all the data match, the terminal/media selecting part 22 decides that the call-relevant information acquired from the terminal control part 21 matches the call-relevant information in the first row R1.

Next, the terminal/media selecting part 22 refers to the changed-terminal/media information in the first row R1 associated with the terminal/media information and call-relevant information in the first row R1. The terminal/media selecting part 22 decides whether all of the communication terminals represented by the changed-terminal/media information in the first row R1 are included or not in the communication terminals represented by the available-terminal information. In the present embodiment, similarly to Embodiment 1, it is assumed that the terminal/media selecting part 22 decides that all of the communication terminals represented by the changed-terminal/media information in the first row R1 are included in the communication terminals represented by the available-terminal information.

As a result, the terminal/media selecting part 22 determines the communication terminal Tb of the terminal ID "IDb" represented by the changed-terminal/media information in the first row R1, as the communication terminal to be incorporated into the audio call, in place of the communication terminal Ta of the terminal ID "IDa" represented by the terminal/media information in the first row R1. Further, the terminal/media selecting part 22 determines the communication terminal Tc of the terminal ID "IDc" represented by the changed-terminal/media information in the first row R1, as the communication terminal to be incorporated into the video call.

Figure 13:
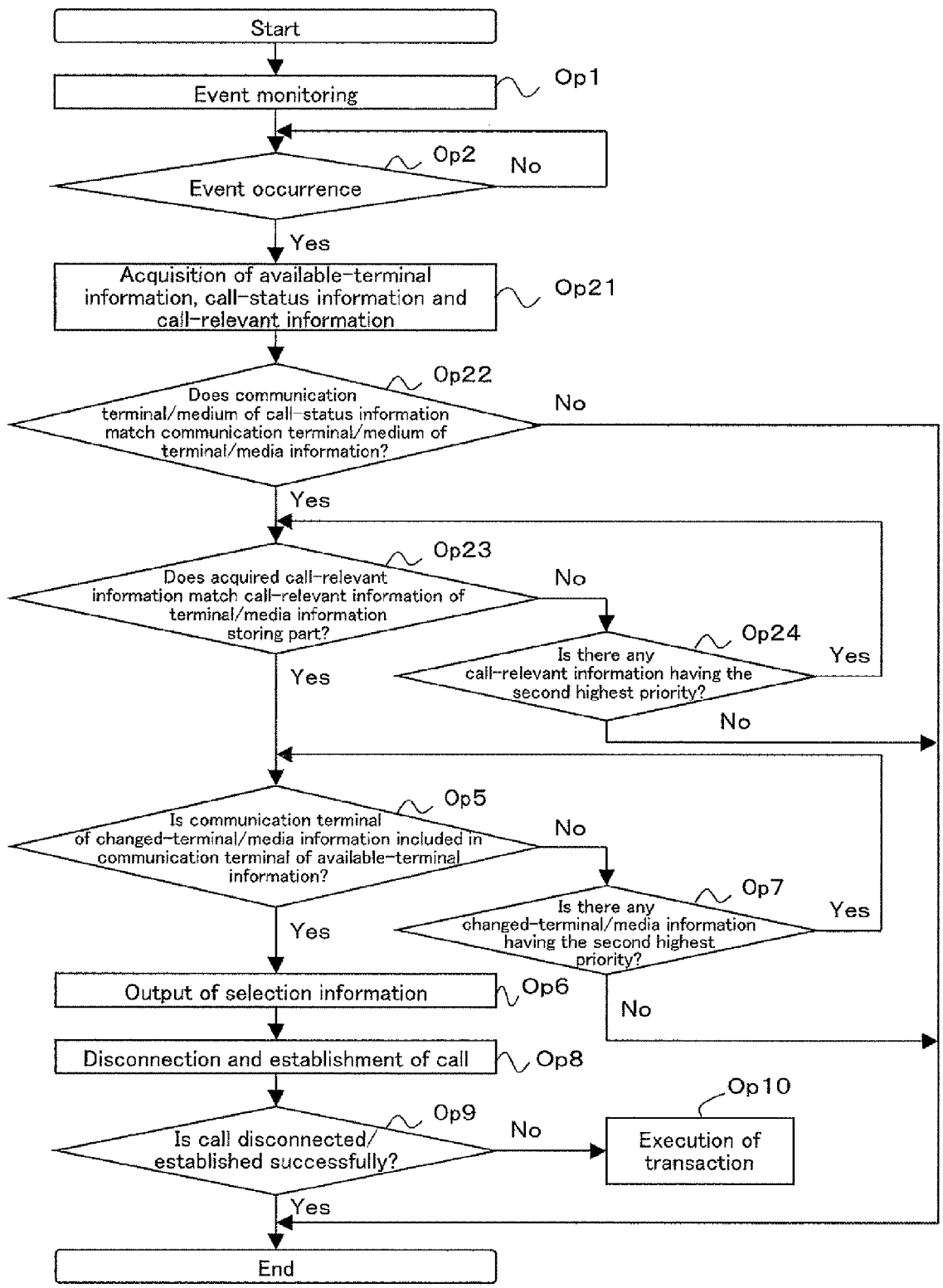
FIG. 13 is a flow chart showing schematically operations of the communication control apparatus.

Next, operations of the communication control apparatus 2 configured as mentioned above will be described with reference to FIG. 13. In FIG. 13, steps analogous to those in FIG. 7 are assigned with identical reference numerals in order to avoid the duplication of explanations.

FIG. 13 is a flow chart showing schematically the operations of the communication control apparatus 2. Namely after the step Op2, the terminal/media selecting part 22 acquires the available-terminal information, the call-status information, and call-relevant information (step Op21) that have been generated by the terminal control part 21.

And in a step Op22, the terminal/media selecting part 22 decides whether the communication terminal represented by the call-status information and the medium of this communication terminal match or not the communication terminal represented by the terminal/media information stored in the terminal/media information storing part 22a and the medium of this communication terminal. When deciding that the communication terminal represented by the call-status information and the medium of this communication terminal match the communication terminal represented by the terminal/media information and the medium of this communication terminal (YES in step Op22), the terminal/media selecting part 22 proceeds to a step Op23, and decides whether the call-relevant information acquired from the terminal control part 21 matches or not the call-relevant information of the terminal/media information storing part 22a. When deciding that the communication terminal represented by the call-status information and the medium of this communication terminal does not match the communication terminal represented by the terminal/media information and the medium of this communication terminal (NO in step Op22), the terminal/media selecting part 22 ends the procedure in FIG. 13.

And, when deciding that the call-relevant information acquired from the terminal control part 21 matches the call-relevant information of the terminal/media information storing part 22a (YES in step Op23), the terminal/media selecting part 22 proceeds to the step Op5, and decides whether the communication terminal represented by the changed-terminal/media information is included or not in the communication terminals represented by the available-terminal information.

When deciding that the call-relevant information acquired from the terminal control part 21 does not match the call-relevant information of the terminal/media information storing part 22a (NO in step Op23), the terminal/media selecting part 22 proceeds to a step Op24, and decides whether call-relevant information having the second highest priority exists or not. When deciding that call-relevant information having the second highest information exists (YES in step Op24), the terminal/media selecting part 22 returns to the step Op23, and decides whether the call-relevant information acquired from the terminal control part 21 matches or not the call-relevant information of the terminal/media information storing part 22a. When deciding that there is no call-relevant information having the second highest priority (NO in step Op24), the terminal/media selecting part 22 ends the procedure in FIG. 13.

As mentioned above, in the communication control apparatus 2 according to the present embodiment, the terminal control part 21 generates call-relevant information further. Here, the term 'call-relevant information' denotes information relating to calls. When the call-status information matches the terminal/media information, and when the call-relevant information generated by the terminal control part 21 matches the call-relevant information stored in the terminal/media information storing part 22a, and further when the communication terminal represented by the changed-terminal/media information is included in the communication terminals represented by the available-terminal information, the terminal/media selecting part 22 determines the communication terminal represented by the changed-terminal/media information, as the communication terminal to be incorporated into a call of the medium of this communication terminal. Thereby not only the call status of the medium of the communication terminal but the status of the call-relevant information relating to the call of the medium of the communication terminal can be taken into consideration. And thus, the communication terminal to be incorporated into the call can be determined flexibly in accordance with the call status and the status of the call-relevant information of the medium of the communication terminal.

Embodiment 3

Figure 14:
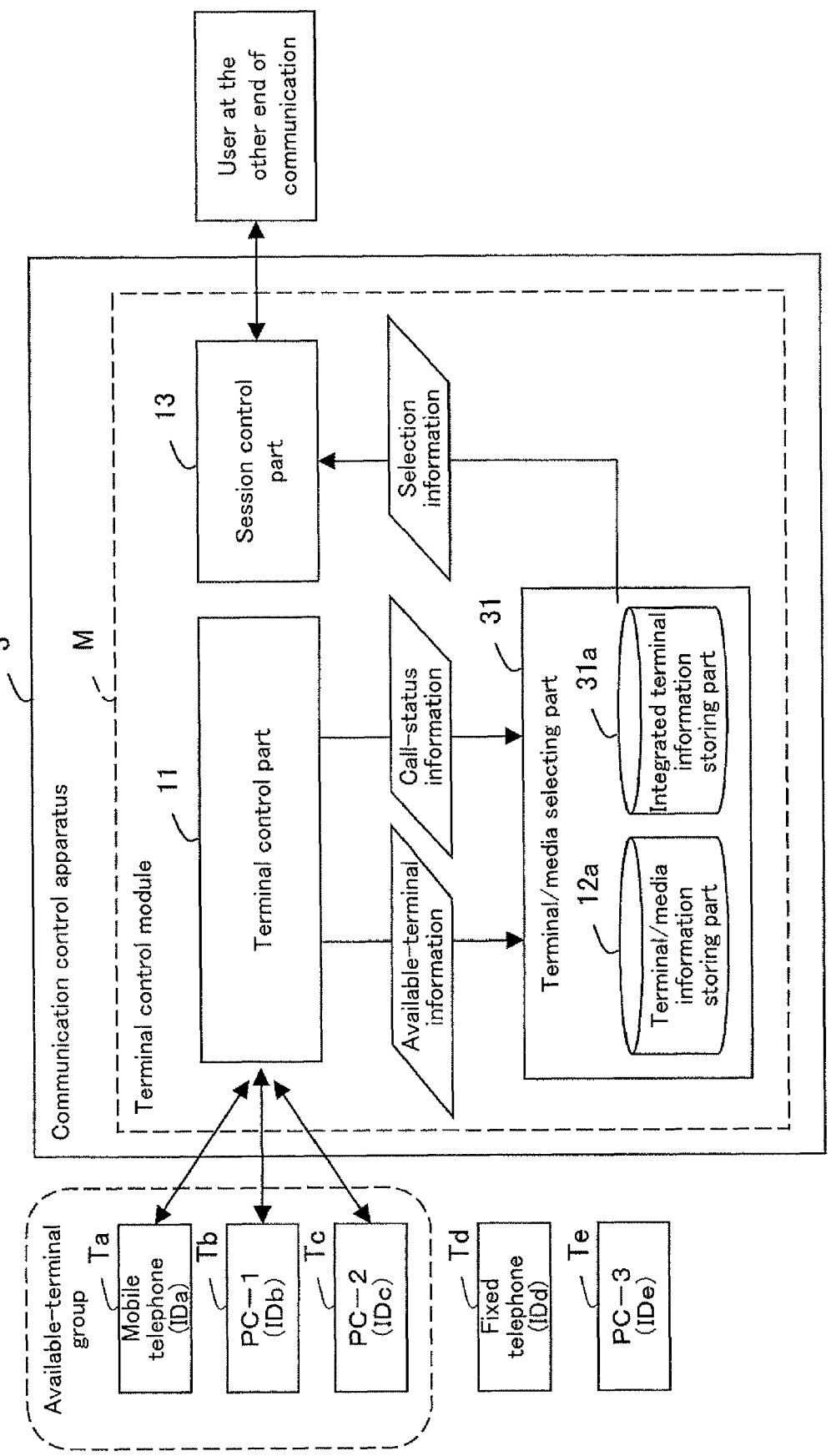
FIG. 14 is a block diagram showing a schematic configuration of a communication control apparatus according to a third embodiment of the present invention.

FIG. 14 is a block diagram showing a schematic configuration of a communication control apparatus 3 according to the present embodiment. The communication control apparatus 3 according to the present embodiment includes a terminal/media selecting part 31 in place of the terminal/media selecting part 12 as shown in FIG. 1. In FIG. 14, components analogous to those in FIG. 1 are assigned with identical reference numerals in order to avoid the duplication of explanations.

Figure 15:
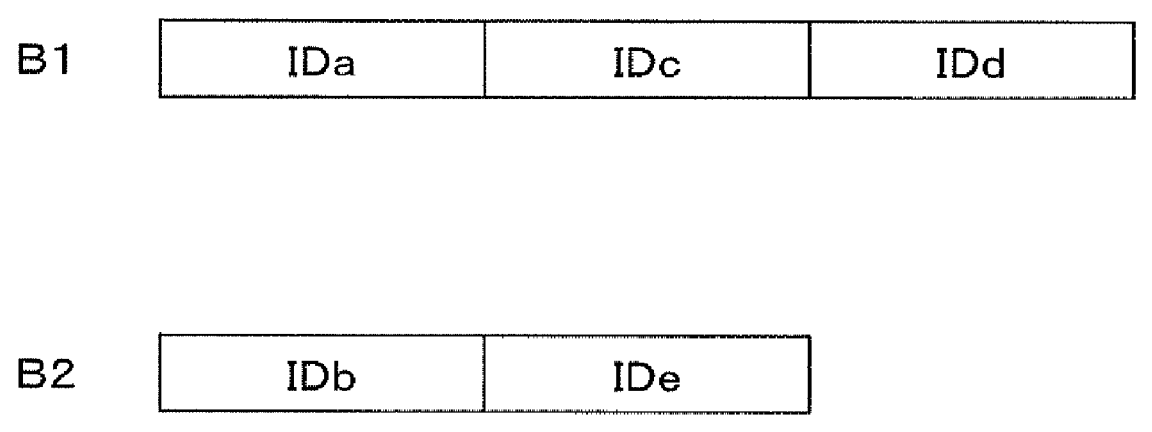

The terminal/media selecting part 31 is distinguished from the terminal/media selecting part 12 as shown in FIG. 1 in that it further includes an integrated terminal information storing part 31a. The integrated terminal information storing part 31a stores integrated terminal information representing a plurality of communication terminals available integrally for a user. FIG. 15 shows an example of a data structure of the integrated terminal information storing part 31a. In the example as shown ion FIG. 15, integrated terminal information $B_1$ and integrated terminal information $B_2$ are stored in the integrated terminal information storing part 31a. The integrated terminal information $B_1$ is information taking the terminal ID "IDa" of the communication terminal Ta, the terminal ID "IDc" of the communication terminal Tc and the terminal ID "IDd" of the communication terminal Td, as one message. The integrated terminal information $B_2$ is information taking the terminal ID "IDb" of the communication terminal Tb and the terminal ID "IDe" of the communication terminal Te, as one message. Namely the integrated terminal information $B_1$ indicates that the communication terminal Ta, communication terminal Tc and communication terminal Td are available in a case where any of the communication terminal Ta, communication terminal Tc and communication terminal Td has a call. The integrated terminal information $B_2$ indicates that the communication terminal Tb and communication terminal Te are available in a case where any of the communication terminal Tb and communication terminal Te has a call. Namely the user defines in advance a communication terminal to be used integrally as 'integrated terminal information'.

Hereinafter, procedures for determining the communication terminals and media by the terminal/media selecting part 31 will be described in detail.

It is assumed that similarly to Embodiment 1, the terminal/media selecting part 31 refers to the changed-terminal/media information in the first row R1 corresponding to the selected terminal/media information in the first row R1, and decides that all of the communication terminals represented by the changed-terminal/media information in the first row R1 are included in the communication terminals represented by the available-terminal information.

In such a case, the terminal/media selecting part 31 first extracts integrated terminal information including a communication terminal represented by the call-status information, from the integrated terminal information storing part 31a. In the present embodiment, the terminal/media selecting part 31 extracts integrated terminal information $B_1$ including the terminal ID "IDa" represented by the call-status information, from the integrated terminal information storing part 31a.

Then, the terminal/media selecting part 31 decides whether the communication terminal represented by the changed-terminal/media information in the first row R1 is included or not in the communication terminals represented by the integrated terminal information. In the present embodiment, the terminal/media selecting part 31 decides whether both the terminal ID "IDb" and the terminal ID "IDc" represented by the changed-terminal/media information in the first row R1 are included or not in the terminal ID "IDa", the terminal ID "IDc" and the terminal ID "IDd" represented by the integrated terminal information $B_1$. Here, it is assumed that the terminal/media selecting part 31 decides that the communication terminal represented by the changed-terminal/media information in the first row R1 is not included in the communication terminals represented by the integrated terminal information $B_1$.

Therefore, the terminal/media selecting part 31 further decides whether the communication terminal represented by the changed-terminal/media information in the second row R2 having the second highest priority is included or not in the communication terminals represented by the integrated terminal information. In the present embodiment, the terminal/media selecting part 31 decides whether all of the terminal ID "IDa" and the terminal ID "IDc" represented by the changed-terminal/media information in the second row R2 are included or not in the terminal ID "IDa", the terminal ID "IDc" and the terminal ID "IDd" represented by the integrated terminal information $B_1$. Here, the terminal/media selecting part 31 decides that the communication terminal represented by the changed-terminal/media information in the second row R2 is included in the communication terminals represented by the integrated terminal information $B_1$.

As a result, the terminal/media selecting part 31 determines the terminal ID "IDa" represented by the changed-terminal/media information in the second row R2, as the communication terminal to be incorporated into the audio call. The terminal/media selecting part 31 determines also the communication terminal Tc of the terminal ID "IDc" represented by the changed-terminal/media information in the second row R2, as the communication terminal to be incorporated into the video call.

Figure 16:
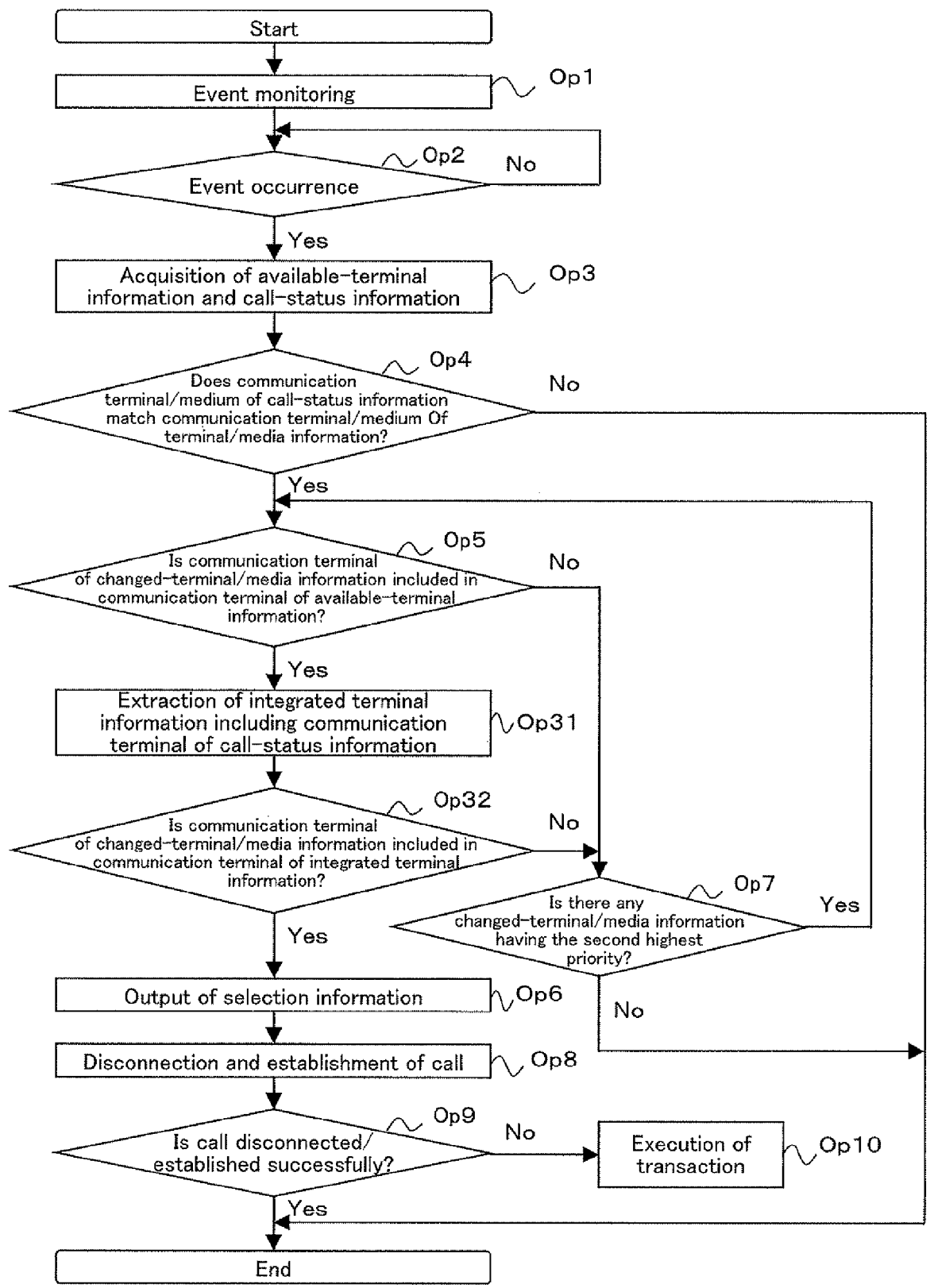
FIG. 16 is a flow chart showing schematically operations of the communication control apparatus.

Hereinafter, operations of the communication control apparatus 3 configured as mentioned above will be described with reference to FIG. 16. In FIG. 16, steps analogous to those in FIG. 7 are assigned with identical reference numerals in order to avoid the duplication of explanations.

FIG. 16 is a flow chart showing schematically the operations of the communication control apparatus 3. Namely subsequent to the step Op5, the terminal/media selecting part 31 extracts the integrated terminal information including the communication terminal represented by the call-status information, from the integrated terminal information storing part 31a (step Op31).

In a step Op32, the terminal/media selecting part 31 decides whether all of the communication terminals represented by the changed-terminal/media information are included or not in the communication terminals represented by the integrated terminal information that has been extracted in the step Op31. When deciding that all of the communication terminals represented by the changed-terminal/media information are included in the communication terminals represented by the integrated terminal information that has been extracted in the step Op31 (YES in step Op32), the terminal/media selecting part 31 proceeds to the step Op6, and outputs the selection information to the session control part 13. When deciding that not all of the communication terminals represented by the changed-terminal/media information are included in the communication terminals represented by the integrated terminal information that has been extracted in the step Op31 (NO in step Op32), the terminal/media selecting part 31 proceeds to the step Op7, and decides whether there is any changed-terminal/media information having the second highest priority.

As described above, in the communication control apparatus 3 of the present embodiment, the terminal/media selecting part 31 extracts integrated terminal information including the communication terminal represented by call-status information, from the integrated terminal information storing part 31a. In a case where the communication terminal represented by the changed-terminal/media information is included in the communication terminals represented by the thus extracted integrated terminal information, the terminal/media selecting part 31 determines the communication terminals represented by the changed-terminal/media information, as the communication terminal to be incorporated into a call of medium of this communication terminal. Thereby it is possible to determine a communication terminal to be incorporated into a call, from the communication terminals represented by the integrated terminal information. And thus, for example, in a case where a user is not present in the vicinity of a certain communication terminal, even if the above-mentioned event occurs due to operations of this communication terminal by a third person, the terminal/media selecting part 31 does not determine this communication terminal as a communication terminal to be incorporated into a call unless this communication terminal is defined in the integrated terminal information. Namely by defining a plurality of communication terminals available integrally for a user as the integrated terminal information, incorporation of a communication terminal into a call not expected by the user can be prevented. It is preferable that this integrated terminal information is associated with a presentation system or the like so that it can be changed dynamically in accordance with the move of the user and thus the integrated terminal information is composed of a terminal group that is located constantly in the vicinity of the user.

Embodiment 4

Figure 17:
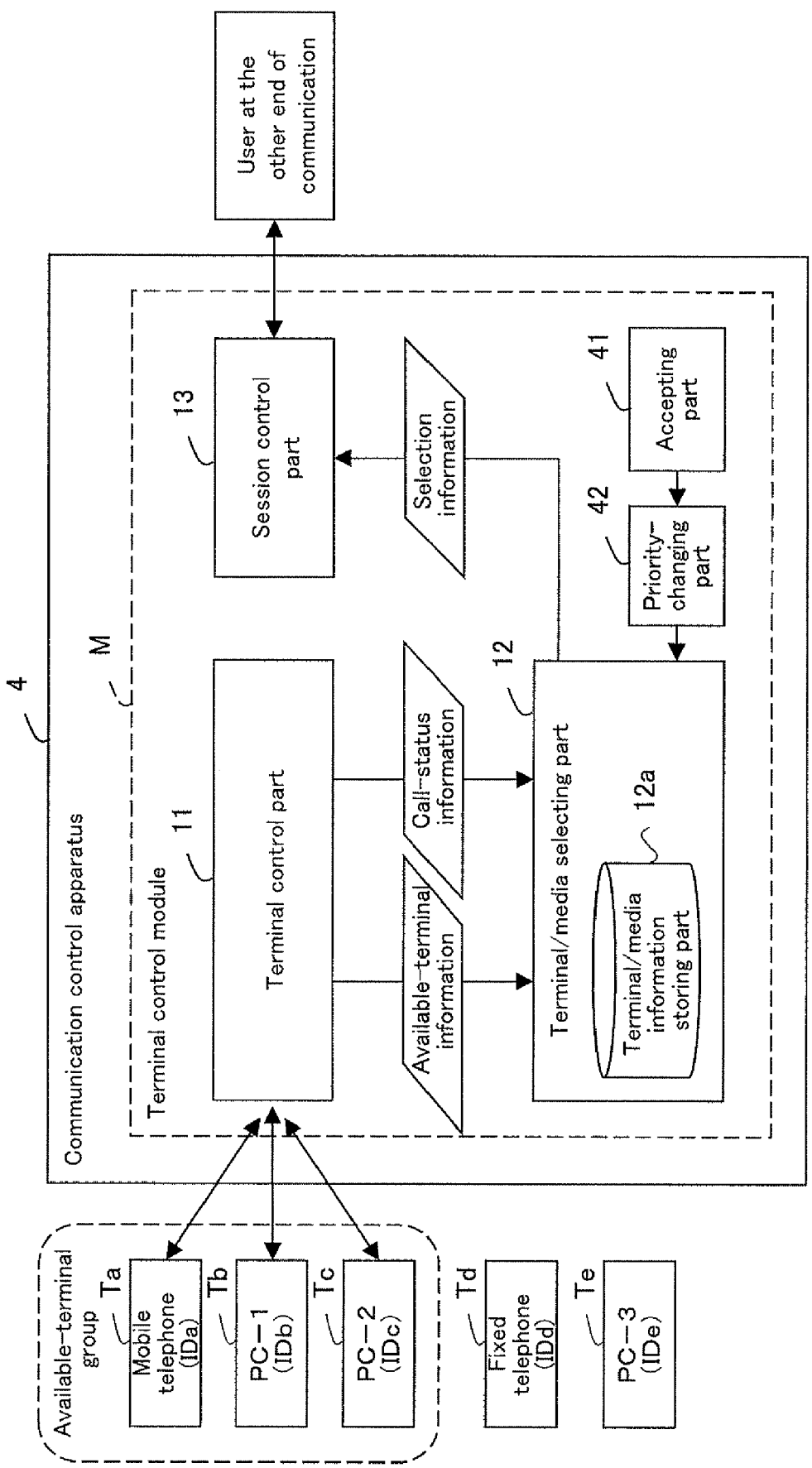
FIG. 17 is a block diagram showing a schematic configuration of a communication control apparatus according to a fourth embodiment of the present invention.

FIG. 17 is a block diagram showing a schematic configuration of a communication control apparatus 4 according to the present embodiment. Namely the communication control apparatus 4 according to the present embodiment is distinguished from the communication control apparatus 1 as shown in FIG. 1 in that it further includes an accepting part 41 and a priority-changing part 42. In FIG. 17, components analogous to those in FIG. 1 are assigned with identical reference numerals in order to avoid the duplication of explanations.

The accepting part 41 accepts terminal/media information and also changed-terminal/media information corresponding to this terminal/media information, from the manager of the communication control apparatus 4. For this purpose, the accepting part 41 is configured as an arbitrary input device such as a keyboard, a mouse, ten keys, a touch panel, a speech recognizer or the like. In the present embodiment, the accepting part 41 accepts terminal/media information representing a communication terminal Ta and audio media information Ms of this communication terminal Ta, from the manager of the communication control apparatus 4. Further the accepting part 41 accepts changed-terminal/media information from the manager of the communication control apparatus 4, where the changed-terminal/media information represents the communication terminal Td and audio media information Ms of this communication terminal Td, and represents the communication terminal Tc and video media information Mv of this communication terminal. Alternatively the accepting part 41 can accept the terminal/media information and the changed-terminal/media information from any of the plural communication terminals.

In a case where the terminal/media information accepted by the accepting part 41 has been stored in the terminal/media information storing part 12a, the priority-changing part 42 changes the priority retained in the terminal/media information storing part 12a so that the priority of the terminal/media information accepted by the accepting part 41 becomes higher than that of the terminal/media information that has been stored in the terminal/media information storing part 12a.

In the present embodiment, the priority-changing part 42 first decides whether the terminal ID "IDa" of the communication terminal Ta represented by the terminal/media information accepted by the accepting part 41 and the media information "Ms" have been stored or not in the terminal/media information storing part 12a (see FIG. 5). Here, the priority-changing part 42 decides that the terminal/media information accepted by the accepting part 41 has been stored in the terminal/media information storing part 12a, as the terminal/media information in the first row R1 and the second row R2. Therefore, the priority-changing part 42 changes the priority retained in the terminal/media information storing part 12a so that the priority of the terminal/media information accepted by the accepting part 41 becomes higher than that of the terminal/media information in the first row R1 and the terminal/media information in the second row R2 that have been stored in the terminal/media information storing part 12a.

For instance, the priority-changing part 42 updates the priority of the terminal/media information in the first row R1 from "5" to "4", and the priority of the terminal/media information in the second row R2 from "4" to "3". And, by adding a new record to the terminal/media information storing part 12a as shown in FIG. 5, the priority-changing part 42 sets the terminal/media information and the changed-terminal/media information accepted by the accepting part 41, as the terminal/media information and the changed-terminal/media information in the new first row R1. For this purpose, the priority-changing part 42 carries down the terminal/media information and the changed-terminal/media information in the first to fourth rows R1-R4, which have been stored in the terminal/media information storing part 12a, to terminal/media information and changed-terminal/media information in the second to fifth rows R2-R5. And the priority-changing part 42 associates a new priority "5" with the terminal/media information and the changed-terminal/media information in the new first row R1. FIG. 18 shows an example of a data structure of the terminal/media information storing part 12a that has been changed by the priority-changing part 42. As shown in FIG. 18, the priority of the terminal/media information accepted by the accepting part 41 becomes higher than that of the terminal/media information in the second row R2 and the terminal/media information in the third row R3 that have been stored in the terminal/media information storing part 12a.

As mentioned above, in the communication control apparatus 4 according to the present embodiment, the accepting part 41 accepts terminal/media information and changed-terminal/media information that corresponds to this terminal/media information. In a case where the thus accepted terminal/media information has been stored in the terminal/media information storing part 12a, the priority-changing part 42 changes the priority retained in the terminal/media information storing part 12a so that the priority of the thus accepted terminal/media information becomes higher than that of the terminal/media information that has been stored in the terminal/media information storing part 12a. Thereby the communication terminal represented by the changed-terminal/media information accepted by the accepting part 41 becomes a communication terminal to be incorporated into a call preferentially in comparison with a communication terminal represented by the changed-terminal/media information that has been stored in the terminal/media information storing part 12a. For this reason, for instance, it is possible to determine a communication terminal to be incorporated into a call preferentially in accordance with the user's convenience or the situation of the communication terminal.

Embodiment 5

Figure 19:
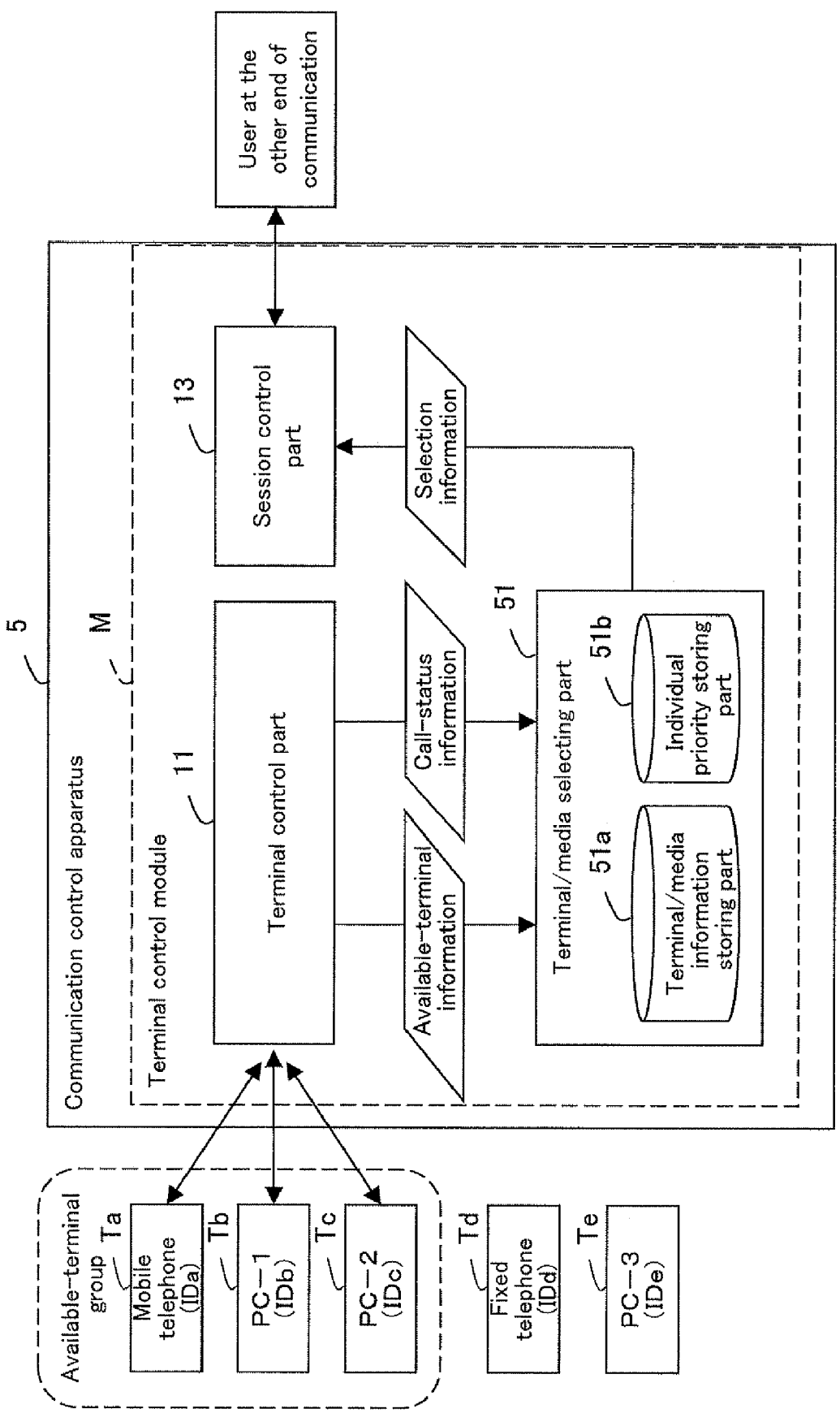
FIG. 19 is a block diagram showing a schematic configuration of a communication control apparatus according to a fifth embodiment of the present invention.

FIG. 19 is a block diagram showing a schematic configuration of a communication control apparatus 5 according to the present embodiment. Namely the communication control apparatus 5 according to the present embodiment includes a terminal/media selecting part 51 in place of the terminal/media selecting part 12 as shown in FIG. 1. In FIG. 19, components analogous to those in FIG. 1 are assigned with identical reference numerals in order to avoid the duplication of explanations. The terminal/media selecting part 51 has a terminal/media information storing part 51a in place of the terminal/media information storing part 12a as shown in FIG. 1. FIG. 20 shows an example of a data structure of the terminal/media information storing part 51a. In the example as shown in FIG. 20, similarly to the terminal/media information storing part 12a as shown in FIG. 1, the terminal/media information storing part 51a stores "terminal/media information", "priority" and "changed-terminal/media information".

The terminal/media selecting part 51 is distinguished from the terminal/media selecting part 12 as shown in FIG. 1 in that it includes further an individual priority storing part 51b. The individual priority storing part 51b retains an individual priority that has been set for a combination of a communication terminal and a medium of this communication terminal. FIG. 21 shows an example of a data structure of the individual priority storing part 51b. In the example as shown in FIG. 21, audio "10", video "0" and data "0" are stored in the individual priority storing part 51b, as the individual priority of the communication terminal Ta of the terminal ID "IDa". Further, audio "3" video "3" and data "3" are stored as the individual priority of the communication terminal Tb of the terminal ID "IDb". Furthermore, audio "10," video "5" and data "3" are stored as the individual priority of the communication terminal Tc of the terminal ID "IDc".

FIG. 20 shows an example where the terminal/media information storing part 51a stores terminal/media information, a priority and changed-terminal/media information in a table form, but the present invention is not limited to this example. Similarly FIG. 21 shows an example where the individual priority storing part 51b stores the individual priority in a table form, but the present invention is not limited to this example. Namely the storing form is selected arbitrarily.

Hereinafter; the procedure of determining the communication terminal and media by the terminal/media selecting part 51 will be described in detail.

It is assumed in the present embodiment that the terminal/media selecting part 51 selects changed-terminal/media information in the first row R1 of the terminal/media information storing part 51a on the basis of the call-status information and the priority acquired from the terminal control part 11.

And the terminal/media selecting part 51 determines whether all of the communication terminals represented by the changed-terminal/media information in the first row R1 are included or not in the communication terminals represented by the available-terminal information. In the present embodiment, the terminal/media selecting part 51 decides whether all of the terminal ID "IDa", the terminal ID "IDb" and the terminal ID "IDe" represented by the changed-terminal/media information in the first row R1 are included or not in the terminal ID "IDa", the terminal ID "IDb" and the terminal ID "IDc" represented by the available-terminal information (see FIG. 3). Here, the terminal/media selecting part 51 decides that not all of the communication terminals represented by the changed-terminal/media information in the first row R1 are included in the communication terminals represented by the available-terminal information.

For this reason, the terminal/media selecting part 51 extracts the individual priority retained by the individual priority storing part 51b, on the basis of the communication terminal included in the communication terminals represented by the available-terminal information among the plural communication terminals represented by the changed-terminal/media information in the first row R1, and the medium of this communication terminal. In the present embodiment, the terminal/media selecting part 51 first extracts the terminal ID "IDa" and the terminal ID "IDb" represented by the available-terminal information and also the terminal ID "IDa" and terminal ID "IDb" included in the terminal ID "IDc", from the terminal ID "IDa", the terminal ID "IDb" and the terminal ID "IDe" represented by the changed-terminal/media information in the first row R1. The terminal/media selecting part 51 extracts the individual priority retained by the individual priority storing part 51b, on the basis of the communication terminal Ta and the audio media information Ms of this communication terminal Ta. Here, the terminal/media selecting part 51 extracts the individual priority "10". Further the terminal/media selecting part 51 extracts the individual priority retained by the individual priority storing part 51b, on the basis of the communication terminal Tb of the terminal ID "IDb" and the video media information Mv of this communication terminal Tb. Here, the terminal/media selecting part 51 extracts the individual priority "3".

Next, the terminal/media selecting part 51 calculates the summary priority on the basis of the extracted individual priority. In the present embodiment, the terminal/media selecting part 51 calculates the summary priority "13" as the sum of the individual priority on the basis of the extracted individual priorities "10" and "3".

When the thus calculated summary priority is at least equivalent to the threshold value, the terminal/media selecting part 51 determines a communication terminal included in communication terminals represented by the available-terminal information, among the plural communication terminals represented by the changed-terminal/media information, as a communication terminal to be incorporated into the call of the medium of this communication terminal. In the present embodiment, the terminal/media selecting part 51 first decides whether the thus calculated summary priority "13" is at least equivalent to the threshold value or not. Here, the threshold value is set to the priority "4" in the second row R2 of the terminal/media information storing part 51b. And thus, the terminal/media selecting part 51 decides that the summary priority is at least equivalent to the threshold value. The terminal/media selecting part 51 determines the communication terminal Ta as the communication terminal to be incorporated into the audio call. Further, the terminal/media selecting part 51 determines the communication terminal Tb as the communication terminal to be incorporated into the video call.

Figure 22:
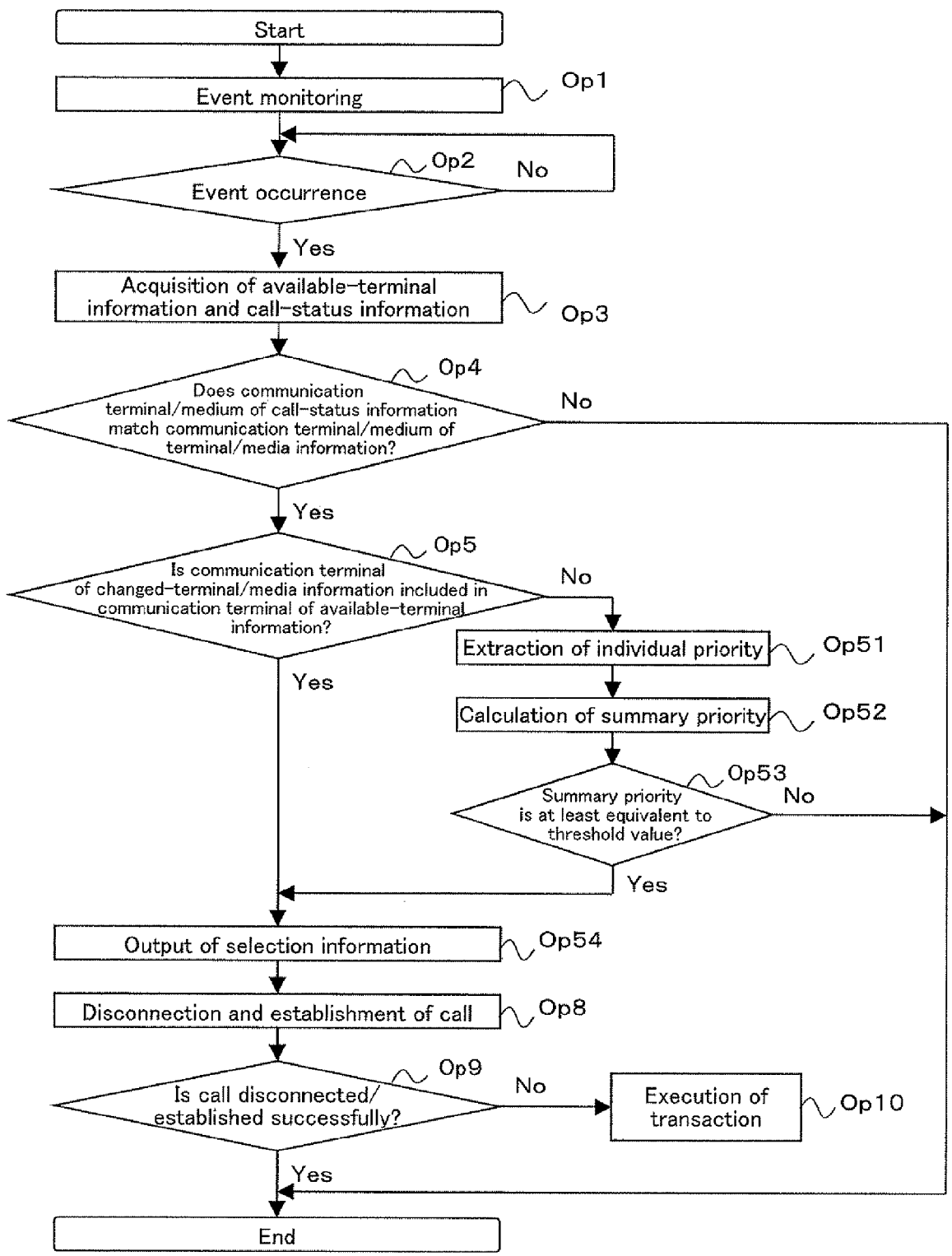
FIG. 22 is a flow chart showing schematically operations of the communication control apparatus.

Hereinafter; the operations of the communication control apparatus 5 configured as described above will be mentioned below with reference to FIG. 22. In FIG. 22, steps analogous to those in FIG. 7 are assigned with identical reference numerals in order to avoid the duplication of explanations.

FIG. 22 is a flow chart showing schematically the operations of the communication control apparatus 5. Namely in the step Op5, after deciding that not all of the communication terminals represented by the changed-terminal/media information are included in the communication terminals represented by the available-terminal information (NO in step Op5), the terminal/media selecting part 51 proceeds to a step Op51. The terminal/media selecting part 51 extracts the individual priority retained in the individual priority storing part 51b (step Op51), on the basis of the communication terminal included in the communication terminals represented by the available-terminal information among the plural communication terminals represented by the changed-terminal/media information and also the medium of the communication terminal. The terminal/media selecting part 51 calculates the summary priority (step Op52), on the basis of the individual priority extracted in the step Op51.

Further, in a step Op53, the terminal/media selecting part 51 decides whether the summary priority calculated in the step Op52 is at least equivalent to the threshold value or not. In a case where the summary priority calculated in the step Op52 is equal to or greater than the threshold value (YES in the step Op53), the terminal/media selecting part 51 determines, among the plural communication terminals represented by the changed-terminal/media information, a communication terminal included in the communication terminals represented by the available-terminal information, as the communication terminal to be incorporated into the call of the medium of this communication terminal. The terminal/media selecting part 51 generates the thus determined information as the selection information. The terminal/media selecting part 51 outputs the thus generated selection information to the session control part 13 (step Op54). On the other hand, if the summary priority calculated in the step Op52 is less than the threshold value (NO in step Op53), the terminal/media selecting part 51 ends the procedure shown in FIG. 22.

As mentioned above, in the communication control apparatus 5 of the present embodiment, even when not all of the communication terminals represented by the changed-terminal/media information are included in the communication terminals represented by the available-terminal information, if the summary priority is at least equivalent to the threshold value, it is possible to determine, among the plural communication terminals represented by the changed-terminal/media information, a communication terminal included in the communication terminals represented by the available-terminal information, as the communication terminal to be incorporated into the call of the medium of this communication terminal. Thereby even when one or more of the plural communication terminals represented by the changed-terminal/media information is/are unavailable, for the purpose of determining available residual communication terminals as the communication terminals to be incorporated into the call, there is no necessity of storing the changed-terminal/media information in the second row R2 and the third row R3 defining the available residual communication terminals, in the terminal/media information storing part 51*a* as shown in FIG. 23 for example. Therefore, it is possible to reduce information volume to be stored in the terminal/media information storing part 51*a*.

Although the above explanation refers to first to fifth embodiments where the communication control apparatus is provided with a terminal control part, a terminal/media selecting part and a session control part as a result of installing the terminal control module, the present invention is not limited to this example. For instance, it is also possible to provide a terminal control part by installing a module in a computer, and provide the terminal/media selecting part and the session control part by installing a module in another computer. In this case, the terminal control part of the former computer communicates with the terminal/media selecting part and the session control part of the other computer by cable or in a wireless manner so as to provide an embodiment of a communication control apparatus of the present invention.

Though the above explanation in the first to fifth embodiments refers to the examples of media such as audio, video and data, the present invention will not be limited to these examples. For instance, media such as texts and chats are also available. Even for audio media, the same medium can be classified into different categories, for example, the right channel for audio and the left channel for audio.

Though the above explanation in the first to fifth embodiment refers to examples of communication terminals such as mobile telephones, fixed telephones and PC-1 to PC-3, the present invention will not be limited thereto. For example, a videophone is available. APC can be classified into different categories depending on the application, for example, a PC on someone's own desk, and a PC in an assembly room.

Namely the present invention is not limited to the above-described first to fifth embodiments but can be modified variably within the range as indicated in the claims. In other words, the technical scope of the present invention includes also the embodiment obtained by combining technical means appropriately modified within the range as indicated in the claims.

INDUSTRIAL APPLICABILITY

As mentioned above, the present invention relates to a ubiquitous computing that provides a computer environment using various instruments at hand instead of user-specific instruments. In particular, the present invention is useful for a communication control apparatus for achieving a ubiquitous communication system in which communication terminals can be determined flexibly or a communication control program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A communication control apparatus that manages an available-terminal group including a plurality of communication terminals available for a user among a plurality of communication terminals, and that controls a call between a communication terminal belonging to the available-terminal group and a communication terminal of another user, thereby functioning as a single and virtual terminal that integrates the available-terminal group with respect to the communication terminal of the other user, the communication control apparatus comprising:

a terminal control part that generates available-terminal information representing a communication terminal belonging to the available-terminal group and call-status information representing a communication terminal having a call among the communication terminals belonging to the available-terminal group and a medium of the communication terminal, a terminal/media information storing part that stores terminal/media information representing a communication terminal and a medium of the communication terminal, and changed-terminal/media information representing a communication terminal to be changed from the communication terminal represented by the terminal/media information and a medium of the communication terminal to be changed, and a terminal/media selecting part that, upon detecting occurrence of an event regarding a communication control sequence or an event regarding terminal environmental change of the communication terminal, determines the communication terminal represented by the changed-terminal media information as a communication terminal to be incorporated into a call of the medium of the communication terminal, when the communication terminal represented by the call-status information and the medium of the communication terminal match the communication terminal represented by the terminal/media information and the medium of the communication terminal and further when the communication terminal represented by the changed-terminal/media information is included in the communication terminals represented by the available-terminal information, wherein the terminal/media information storing part retains a priority in association with the terminal/media information and the changed terminal/media information, and in a case where there are plural pieces of terminal/media information matching the call-status information, the terminal/media selecting part selects terminal/media information having the highest priority among the plural pieces of terminal/media information, and when a communication terminal represented by the changed-terminal/media information associated with the selected terminal/media information is included in the communication terminals represented by the available-terminal information, the terminal/media selecting part determines the communication terminal represented by the changed-terminal/media information as a communication terminal to be incorporated into the call of the medium of the communication terminal.

2. The communication control apparatus according to claim 1, further comprising a session control part that establishes the call of the medium of the communication terminal determined by the terminal/media selecting part, between the communication terminal determined by the terminal/media selecting part and the communication terminal of the other user.

3. The communication control apparatus according to claim 1, further comprising: an accepting part that accepts terminal/media information and changed-terminal/media information corresponding to the terminal/media information; and a priority-changing part that changes priority retained in the terminal/media information storing part so that, in a case where the terminal/media information accepted by the accepting part has been stored in the terminal/media information storing part, the priority of the terminal/media information accepted by the accepting part becomes greater than the priority of terminal/media information that has been stored in the terminal/media information storing part.

4. The communication control apparatus according to claim 1, further comprising an individual priority storing part that retains an individual priority that has been set for a combination of a communication terminal and a medium of the communication terminal, wherein the changed-terminal/media information represents a plurality of communication terminals to be changed from the communication terminals represented by the terminal/media information and media of the plural communication terminals, in a case where not all of the plural communication terminals represented by the changed-terminal/media information are included in the communication terminals represented by the available-terminal information, the terminal/media selecting part extracts the individual priority retained in the individual priority storing part on the basis of the communication terminal included in the communication terminals represented by the available-terminal information and the medium of the communication terminal, among the plural communication terminals represented by the changed-terminal/media information, and calculates a summary priority based on the thus extracted individual priority, and when the calculated summary priority is at least equivalent to a threshold value, then the terminal/media selecting part determines the communication terminal included in the communication terminals represented by the available-terminal information among the plurality of communication terminals represented by the changed-terminal/media information, as a communication terminal to be incorporated in the call of the medium of the communication terminal.

5. The communication control apparatus according to claim 1, wherein the terminal control part further generates call-relevant information that relates to a call at a communication terminal having the call, among the communication terminals belonging to the available-terminal group;

the terminal/media information storing part retains the call-relevant information in association with the terminal/media information and the changed-terminal/media information;

when the communication terminal represented by the call-status information and the medium of the communication terminal match the communication terminal represented by the terminal/media information and the medium of the communication terminal and when the call-relevant information generated by the terminal control part matches the call-relevant information stored in the terminal/media information storing part, and further when the communication terminal represented by the changed-terminal/media information is included in the communication terminals represented by the available-terminal information, the terminal/media selecting part determines the communication terminal represented by the changed-terminal/media information as a communication terminal to be incorporated into the call of medium of the communication terminal.

6. The communication control apparatus according to any one of claim 1, further comprising an integrated terminal information storing part that stores integrated terminal information representing a plurality of communication terminals integrally available for a user, the terminal/media selecting part extracts, from the integrated terminal information storing part, the integrated terminal information including the communication terminal represented by the call-status information, and in a case where the communication terminal represented by the changed-terminal/media information is included in the communication terminals represented by the extracted integrated terminal information, then the terminal/media selecting part determines the communication terminal represented by the changed-terminal/media information, as a communication terminal to be incorporated into the call of the medium of the communication terminal.

7. A non-transitory computer-readable recording media storing a communication control program allowing a computer to manage an available-terminal group including a plurality of communication terminals available for a user among a plurality of communication terminals, and to control a call between the communication terminal belonging to the available-terminal group and a communication terminal of another user, thereby functioning as a single and virtual terminal for combining the available-terminal groups with respect to the communication terminal of the other user, wherein the communication control program allows the computer to execute a terminal control process of generating available-terminal information representing a communication terminal belonging to the available-terminal group and a call-status information representing the communication terminal having the call among the communication terminals belonging to the available-terminal group and the medium of the communication terminal;

wherein the computer is capable of accessing the terminal/media information storing part that stores the terminal/media information representing a communication terminal and a medium of the communication terminal and also a changed-terminal/media information representing a communication terminal to be changed from the communication terminal represented by the terminal/media information and a medium of the communication terminal to be changed, and upon detecting occurrence of an event regarding a communication control sequence or an event regarding a terminal environmental change of the communication terminal, when the communication terminal represented by the call-status information and the medium of the communication terminal match the communication terminal represented by the terminal/media information and the medium of the communication terminal and further when the communication terminal represented by the changed-terminal/media information is included in the communication terminals represented by the available-terminal information, then the communication control program allows the computer to execute further a terminal/media selection process to determine the communication terminal represented by the changed-terminal/media information as a communication terminal to be incorporated into the call of the medium of the communication terminal, wherein the terminal/media information storing part retains a priority in association with the terminal/media information and the changed terminal/media information, and in a case where there are plural pieces of terminal/media information matching the call-status information, the terminal/media selecting part selects terminal/media information having the highest priority among the plural pieces of terminal/media information, and when a communication terminal represented by the changed-terminal/media information associated with the selected terminal/media information is included in the communication terminals represented by the available-terminal information, the terminal/media selecting part determines the communication terminal represented by the changed-terminal/media information as a communication terminal to be incorporated into the call of the medium of the communication terminal.

* * * * *